(12) United States Patent
Okamoto et al.

(10) Patent No.: US 11,505,248 B2
(45) Date of Patent: Nov. 22, 2022

(54) SUBFRAME STRUCTURE

(71) Applicant: MAZDA MOTOR CORPORATION, Hiroshima (JP)

(72) Inventors: Hiroyuki Okamoto, Aki-gun (JP); Fumihiro Kurohara, Aki-gun (JP); Ippei Kuroda, Aki-gun (JP); Hiromasa Honji, Aki-gun (JP); Yosuke Sawada, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 263 days.

(21) Appl. No.: 16/927,728

(22) Filed: Jul. 13, 2020

(65) Prior Publication Data
US 2021/0024132 A1    Jan. 28, 2021

(30) Foreign Application Priority Data

Jul. 24, 2019    (JP) .............................. JP2019-135934

(51) Int. Cl.
| B62D 21/02 | (2006.01) |
| B60G 7/00 | (2006.01) |
| B60K 5/04 | (2006.01) |
| B62D 21/11 | (2006.01) |
| B62D 21/15 | (2006.01) |

(52) U.S. Cl.
CPC ............. *B62D 21/02* (2013.01); *B60G 7/008* (2013.01); *B60K 5/04* (2013.01); *B62D 21/11* (2013.01); *B62D 21/155* (2013.01)

(58) Field of Classification Search
CPC ...... B62D 21/02; B62D 21/11; B62D 21/155; B60G 7/008; B60K 5/04
See application file for complete search history.

(56) References Cited

U.S. PATENT DOCUMENTS

| 2013/0099461 | A1 | 4/2013 | Otani et al. | |
| 2020/0047811 | A1* | 2/2020 | Shimizu | ................. B60K 17/04 |
| 2020/0307699 | A1* | 10/2020 | Takahashi | ............. B62D 21/155 |
| 2021/0024132 | A1* | 1/2021 | Okamoto | ............... B62D 25/08 |

FOREIGN PATENT DOCUMENTS

| EP | 3770041 A1 * | 1/2021 | ............. B60R 17/00 |
| EP | 3770042 A1 * | 1/2021 | ............. B60G 7/008 |
| JP | H11171048 A * | 6/1999 | |
| JP | 2012-011874 A | 1/2012 | |
| WO | WO-2016035506 A1 * | 3/2016 | ............. B62D 21/02 |

* cited by examiner

*Primary Examiner* — Jacob B Meyer
(74) *Attorney, Agent, or Firm* — Studebaker & Brackett PC

(57) ABSTRACT

A subframe structure includes a pair of left and right front-rear frames each mounted with a lower arm; and a transverse member connecting front portions of the front-rear frames. The front-rear frames each includes a rear horizontal portion formed substantially horizontally, an inclined portion extending frontward and upward from a front end of the rear horizontal portion, and a front horizontal portion extending horizontally frontward from a front end of the inclined portion. The transverse member is jointed at left and right ends thereof to the front horizontal portions respectively corresponding to the left and right ends, a rear end of the front horizontal portion is disposed to be positioned frontward of a front end of an engine, and the front-rear frames are deformed into a Z shape in vehicle side view in an event of a front-end collision and thereby energy of the front-end collision is absorbed.

11 Claims, 12 Drawing Sheets

SUBFRAME STRUCTURE

BACKGROUND

Technical Field

The present disclosure relates to a subframe structure for a front suspension including a pair of left and right front-rear frames mounted with respective suspension arms of the front suspension, and a transverse member connecting front portions of the left and right front-rear frames.

Background Art

Typically, a subframe structure is supported by a pair of left and right front side frames extending frontward from a dash panel installed at a front side of a vehicle interior. The front side frames are provided at their respective front ends with a pair of left and right main crash cans, and a bumper beam is provided at front ends of the main crash cans so as to extend in a vehicle width direction.

The subframe structure is provided at its front end with a pair of left and right sub crash cans, and a sub bumper beam is provided at front ends of the sub crash cans so as to extend in a vehicle width direction.

As exemplified in Japanese Patent Laid-Open No. 2012-011874, in the event of a collision at a front side of a vehicle (hereinafter abbreviated as a "front-end collision"), shock absorbing members such as main crash cans and sub crash cans are sequentially crushed rearward in the vehicle, whereby collision energy is absorbed.

When the collision energy cannot be fully absorbed by these shock absorbing members, residual collision energy is expected to be absorbed by breakage or axial compression of front side frames on the vehicle body side.

However, portions of the front side frames that are rearward of a front side of a robust vehicle driving apparatus such as an engine do not crush, and thus energy absorption by these rear portions cannot be expected.

Further, when, for example, the vehicle driving apparatus is a longitudinal engine, its front side is positioned farther frontward than that of a transverse engine, and thus it is important to increase energy absorption at the frontward side as much as possible.

However, Japanese Patent Laid-Open No. 2012-011874 only refers to a case of a relatively light collision whose energy can be fully absorbed by shock absorbing members in a suspension mounting structure, and does not disclose behavior of front-rear frames in the event of a front-end collision whose energy cannot be fully absorbed by the shock absorbing members alone nor positional relationship between the front-rear frames and an engine.

SUMMARY

The present disclosure thus provides a subframe structure that can have its front-rear frames deformed into a Z shape in vehicle side view whereby larger energy absorption can be achieved.

This disclosure is a subframe structure for a front suspension, the subframe structure comprising: a pair of left and right front-rear frames each mounted with a suspension arm; and a transverse member connecting front portions of the front-rear frames, wherein the front-rear frames each include a rear horizontal portion formed substantially horizontally, an inclined portion extending frontward and upward from a front end of the rear horizontal portion, and a front horizontal portion extending horizontally frontward from a front end of the inclined portion, the transverse member is jointed at left and right ends thereof to the front horizontal portions respectively corresponding to the left and right ends, a rear end of the front horizontal portion is disposed to be positioned frontward of a front end of a vehicle driving apparatus, and the front-rear frames are deformed into a Z shape in vehicle side view in an event of a front-end collision and thereby energy of the front-end collision is absorbed.

In the above configuration, the front horizontal portion that does not crush in the event of a front-end collision and is positioned frontward of the vehicle driving apparatus is retracted until the transverse frame directly or indirectly hits a front side of the vehicle driving apparatus, and thereby each front-rear frame is deformed into a Z shape in vehicle side view. This consequently allows for large energy absorption by the subframe structure.

Here, deforming the front-rear frame into a Z shape in vehicle side view in the event of a front-end collision as described above refers to bending and deforming the front-rear frame in the event of the front-end collision such that the front horizontal portion is offset upward relative to the rear horizontal portion while coming closer to the rear horizontal portion in the vehicle front-rear direction, and includes, for example, bending and deforming the front-rear frame such that the front horizontal portion overlaps the rear horizontal portion in the vehicle front-rear direction.

In one aspect of this disclosure, a rear end of the inclined portion is disposed to be positioned frontward of the front end of the vehicle driving apparatus.

The above configuration can facilitate deformation of the front-rear frame such that the front horizontal portion is retracted while being separated above from the rear horizontal portion. That is, the above configuration can facilitate breakage of the front-rear frame into a Z shape in vehicle side view.

In one aspect of this disclosure, a recess extending in a vehicle width direction is formed in at least one of a rear boundary portion that is located at a boundary between the rear horizontal portion and the inclined portion and a front boundary portion that is located at a boundary between the inclined portion and the front horizontal portion.

In the above configuration, breakage of either of the front boundary portion and the rear boundary portion formed with the recess in the event of a front-end collision can be facilitated by the recess.

In one aspect of this disclosure, the recess is formed in each of the rear boundary portion and the front boundary portion, and the recess is formed on an upper wall of the front-rear frame in the rear boundary portion, and formed on a lower wall of the front-rear frame in the front boundary portion.

In the above configuration, both of the front boundary portion and the rear boundary portion are formed with the respective recesses on their sides that are compressed by bending in the event of a front-end collision, and this can facilitate bending (breakage) of these front and rear boundary portions.

In one aspect of this disclosure, a vehicle component disposed frontward of the vehicle driving apparatus is mounted on an upper wall of the inclined portion via a vehicle component mounting bracket, the vehicle component mounting bracket at least has a length corresponding to a total length of the inclined portion in an extending direction of the inclined portion. Also, of a rear boundary portion that is located at a boundary between the rear horizontal portion and the inclined portion and a front boundary portion that is located at a boundary between the inclined portion and the front horizontal portion, the vehicle component mounting bracket is disposed to only overlap the front boundary portion in a vehicle front-rear direction.

When the vehicle component is mounted on the upper wall of the inclined portion via the vehicle component mounting bracket, disposing the vehicle component mounting bracket such that it does not overlap the rear boundary portion as described above can restrain the vehicle component mounting bracket from inhibiting compressive bending of the upper wall of the front-rear frame in the rear boundary portion.

In one aspect of this disclosure, the vehicle component mounting bracket is configured to mount the vehicle component at a position separated above from an upper wall corresponding to the front boundary portion in the front-rear frame.

In the above configuration, when the front-rear frame is deformed into a Z shape in vehicle side view in the event of a front-end collision, the upper wall corresponding to the front boundary portion in the front-rear frame is extensively deformed (deformed by outward bending) as described above, and there is a fear that such deformation is inhibited by covering the upper wall corresponding to the front boundary portion in the rear frame with the rigid vehicle component mounting bracket from front and above.

More specifically, it is more preferable to cover the upper wall in the front bent portion, which is bent outward during deformation of the front-rear frame into a Z shape in vehicle side view in the event of a front-end collision, than the upper wall in the rear bent portion, which is bent inward during the above deformation of the front-rear frame, with the vehicle component mounting bracket from above, because the former is less likely to inhibit the deformation of the corresponding bent portion. However, if the upper wall of the front bent portion is covered with the vehicle component mounting bracket such that a bottom side of the vehicle component mounting bracket closely contacts the upper wall, the vehicle component mounting bracket would inhibit the start of breakage deformation of the front bent portion in the event of a front-end collision.

Thus, in the present disclosure, the vehicle component mounting bracket is disposed at a position separated above from the upper wall corresponding to the front boundary portion in the front-rear frame, and this can restrain the rigid vehicle component mounting bracket from inhibiting the outward bending of the upper wall.

In one aspect of this disclosure, the vehicle component is a stabilizer extending in a vehicle width direction so as to connect the pair of left and right front-rear frames.

The vehicle component mounting bracket is configured to have high rigidity to support the stabilizer, which experiences torsional stress during traveling of the vehicle. In the present disclosure, the above configuration ensures that the front-rear frame is deformed into a Z shape in vehicle side view in the event of a front-end collision even in the configuration in which the vehicle component mounting bracket with such high rigidity is mounted on the upper wall of the front-rear frame.

In one aspect of this disclosure, the front-rear frame has an upper and lower divided structure composed of an upper-side member and a lower-side member, and the upper-side member and the lower-side member are joined to form a shape of the front-rear frame, and the front-rear frame is provided with an unjoined portion at a portion thereof overlapping the vehicle component mounting bracket in the vehicle front-rear direction. The unjoined portion is a portion where the upper-side member and the lower-side member are not joined.

In the above configuration, the unjoined portion is provided at a portion of the front-rear frame in the vehicle front-rear direction overlapping the vehicle component mounting bracket, and this can restrain the bending deformation of the front boundary portion in the event of a front-end collision from being inhibited by increased rigidity of the front-rear frame caused by joining the stabilizer to the front-rear frame via the vehicle component mounting bracket.

In one aspect of this disclosure, the lower-side member is formed to have lower strength than strength of the upper-side member.

The above configuration can facilitate the deformation of the front-rear frame into a Z shape in vehicle side view in the event of a front-end collision.

In one aspect of this disclosure, the front-rear frame is structured such that the rear horizontal portion is positioned on a vehicle-width-direction inner side relative to a front end of the front horizontal portion and the front-rear frame is gradually positioned toward a vehicle-width-direction outer side from the front end of the rear horizontal portion to the front end of the front horizontal portion.

The above configuration can prevent the front-rear frame from experiencing breakage in the vehicle width direction in the event of a front-end collision that would hinder the front-rear frame from being bent and deformed into a Z shape in vehicle side view.

According to this disclosure, retracting the front horizontal portion positioned frontward of the vehicle driving apparatus that does not crush in the event of a front-end collision allows the front-rear frame to be deformed into a Z shape in vehicle side view, whereby large energy absorption by the subframe structure can be achieved.

DETAILED DESCRIPTION

Referring to FIGS. 1 to 10, a description will be given of a front vehicle body structure having a suspension subframe structure of the present embodiment.

In the figures, an arrow F represents a vehicle frontward direction, an arrow U represents a vehicle upward direction, an arrow R represents a vehicle rightward direction, and an arrow L represents a vehicle leftward direction.

Figure 1:
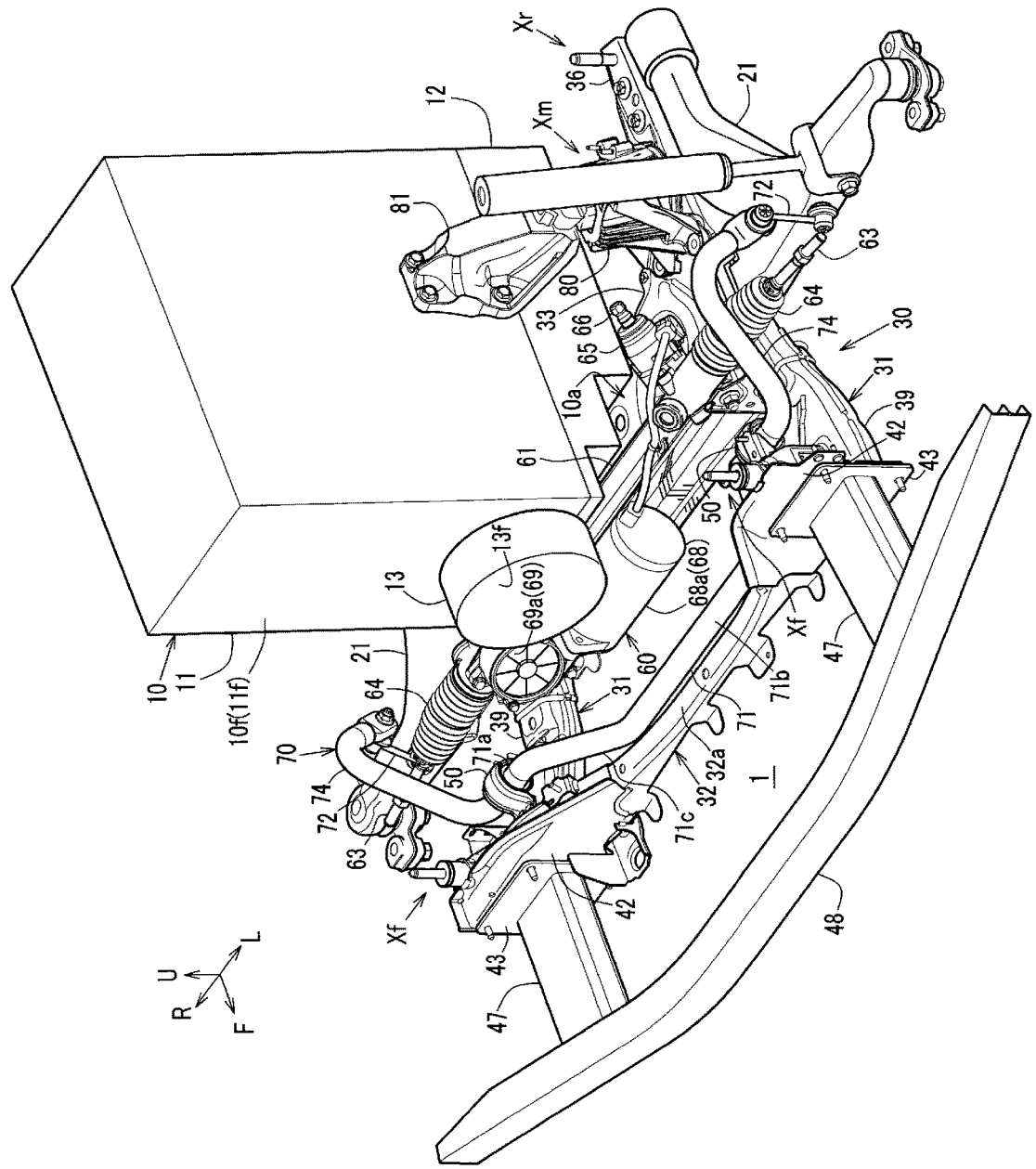
FIG. 1 is an external view of a front vehicle body structure having a front suspension subframe structure of the present embodiment, as viewed from the front.
Figure 3:
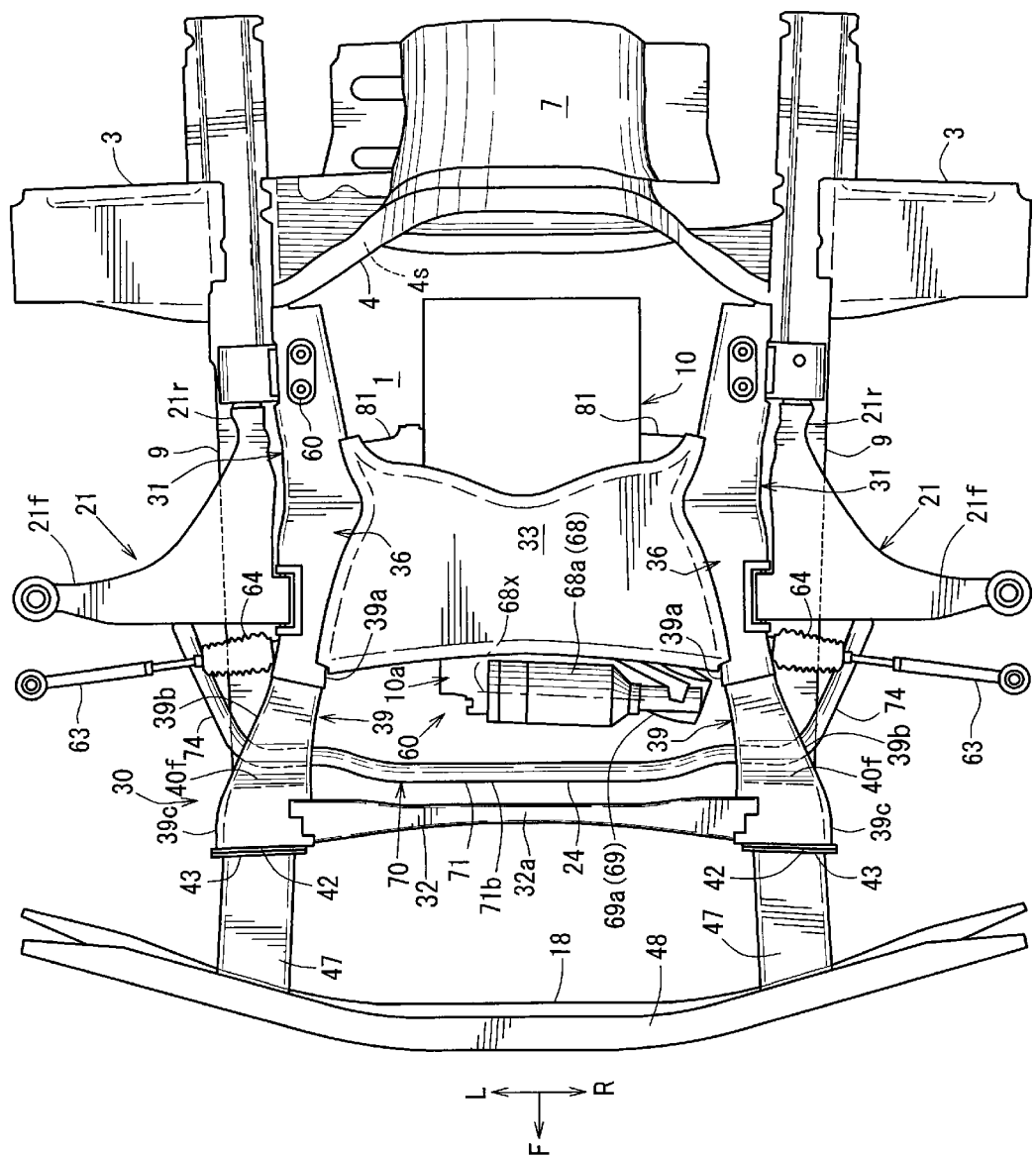
FIG. 3 is a bottom view of the front vehicle body structure having the subframe structure of the present embodiment.
Figure 4:
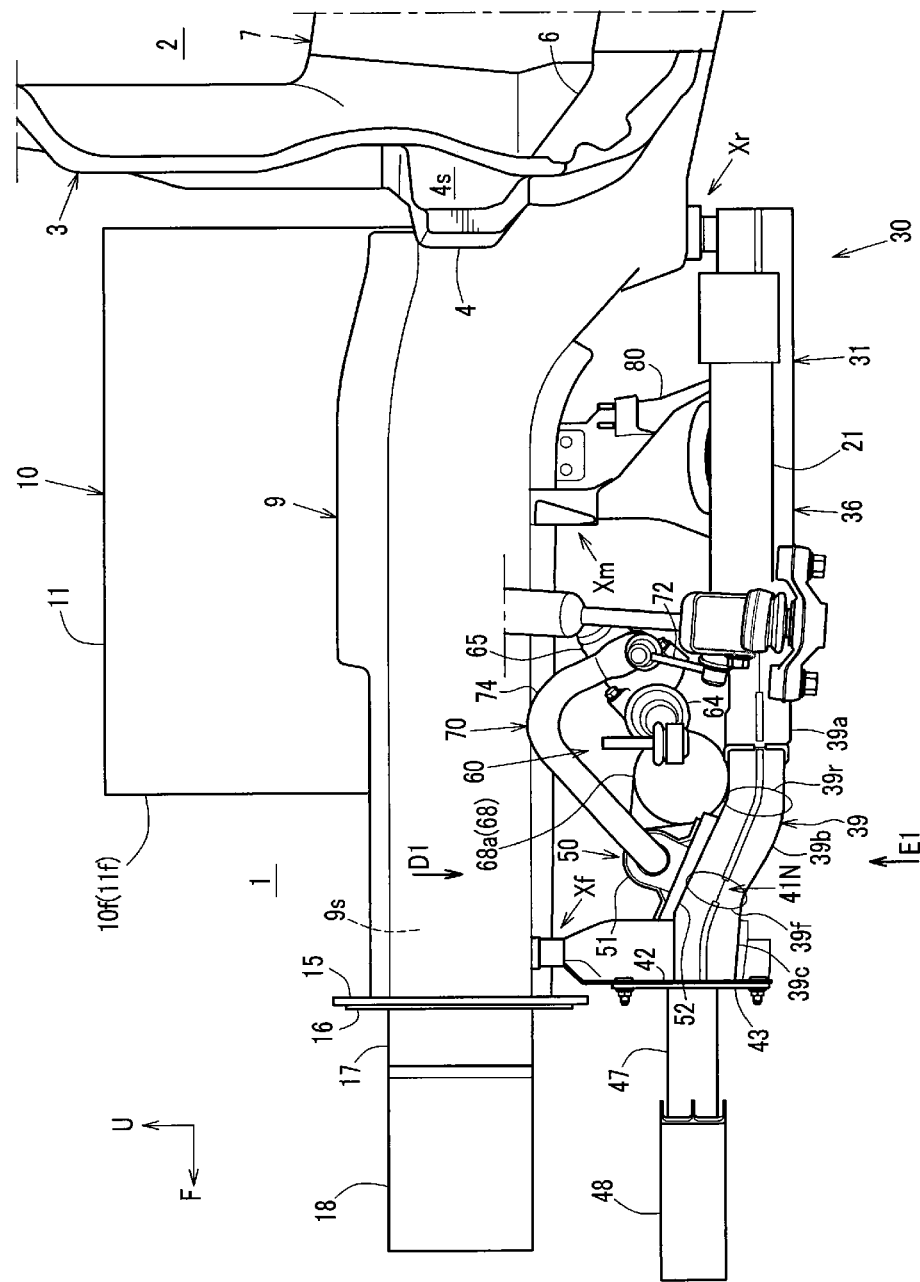
FIG. 4 is a left side view of the front vehicle body structure having the subframe structure of the present embodiment.

As shown in FIGS. 1 and 4, the front vehicle body structure includes: an engine 10 disposed in an engine compartment 1 partitioned from a vehicle interior 2 by a dash panel 3 (dash lower panel) (see FIGS. 1 to 3); front side frames 9 (see the same figures) extending in a vehicle front-rear direction at respective sides of the engine compartment 1; a suspension subframe structure 30 (hereinafter referred to as a "subframe 30") supported by the front side frames 9.

Figure 2:
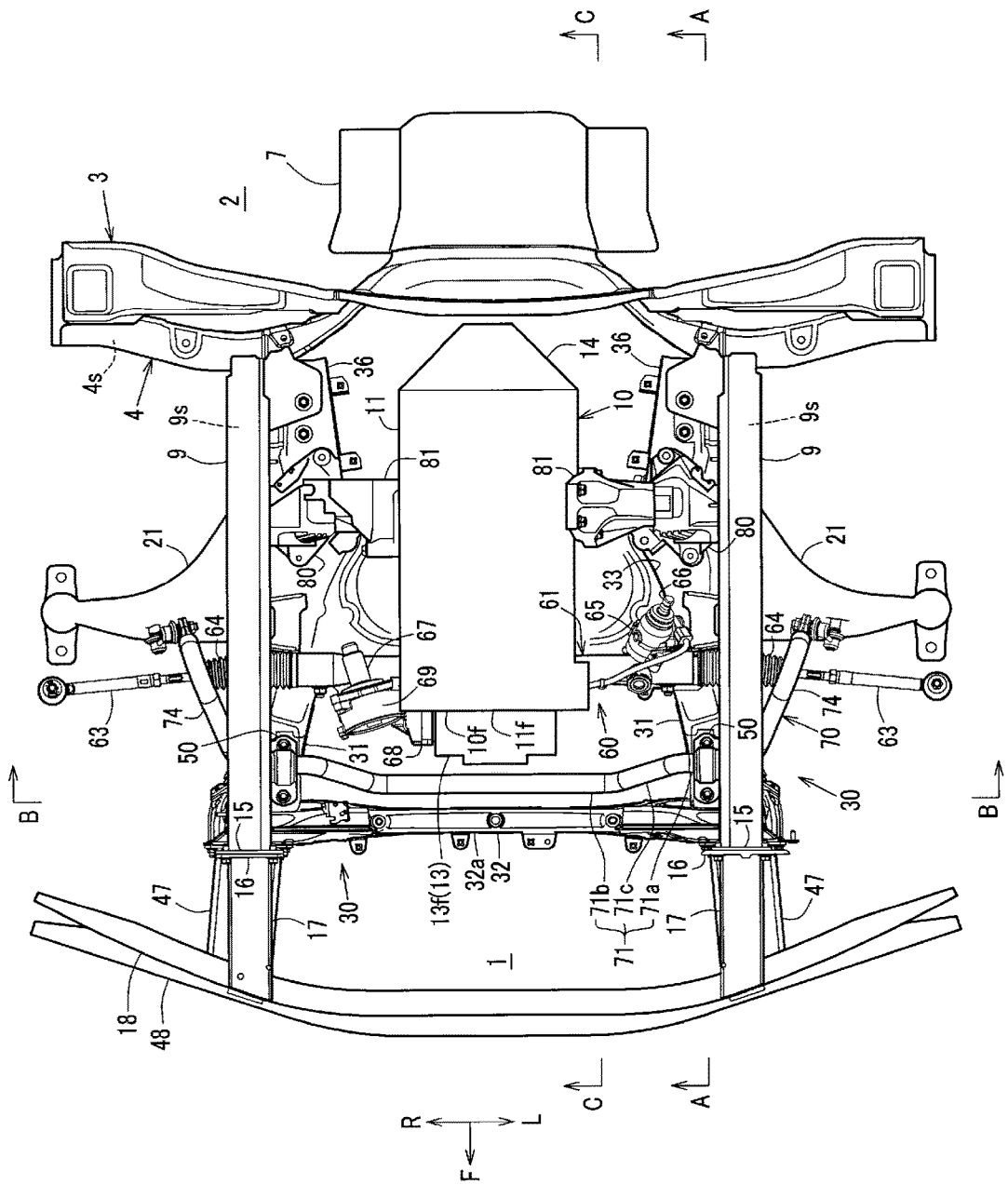
FIG. 2 is a plan view of the front vehicle body structure having the subframe structure of the present embodiment.

In this embodiment, the drive system of the vehicle is a front engine rear drive (FR) system. As shown in FIG. 1, the engine 10 includes: a cylinder block 11 as an engine body; an oil pan 12 located below the cylinder block 11; and a pulley 13 as an accessory protruding frontward from a lower portion of a front side (11f) of the cylinder block 11, and the engine 10 is longitudinally installed such that a cylinder array is oriented along the vehicle front-rear direction. As shown in FIG. 2, a power train including a transmission 14 connected to the engine 10 is installed rearward of the engine 10 in the engine compartment 1.

Reference numeral 4 in FIGS. 2 to 4 denotes a dash cross member and, as shown in FIG. 4, the dash cross member 4 is joined to a front face of the dash panel 3 such that a closed cross-section 4s extending in a vehicle width direction is formed between the dash cross member 4 and the front face of the dash panel 3. Reference numeral 6 in FIG. 4 denotes a floor panel defining a floor of the vehicle interior 2, and the floor panel 6 is disposed continuously from a lower portion of the dash panel 3. Reference numeral 7 in FIGS. 2 to 4 denotes a tunnel portion, and the tunnel portion 7 is provided at the center in the vehicle width direction of the dash panel 3 and the floor panel 6 so as to protrude into the vehicle interior 2.

A belt for transmitting rotation of the engine 10 to an alternator (power generator) to thereby drive the alternator is stretched around the pulley 13, though not shown in the figures.

As shown in FIGS. 2 and 4, the pair of left and right front side frames 9 extend from the dash panel 3 and the dash cross member 4 frontward farther than the front side (10f) of the engine 10. Each of the front side frames 9 is a vehicle body strengthening member having a closed cross-section 9s extending in the vehicle front-rear direction.

As shown in FIGS. 2 and 4, a main crash can 17 composed of a cylindrical body and the like for absorbing an impact load from the front of the vehicle is connected to a front end of each of the left and right front side frames 9 via a set plate 15 and a mounting plate 16. A main bumper beam 18 extending in the vehicle width direction is mounted on front end faces of the pair of left and right main crash cans 17.

Now a description will be given of the aforementioned subframe 30. The subframe 30 includes a pair of left and right front-rear frames 31 disposed below the front side frames 9 and supporting respective lower arms 21 as suspension members for front wheels, and a front cross member 32 and a center cross member 33 each connecting the left and right front-rear frames 31.

As shown in FIG. 3, each lower arm 21 supported by the suspension subframe structure 30 includes a front arm portion 21f extending substantially parallel to the vehicle width direction, and a rear arm portion 21r extending substantially horizontally from an intermediate portion in the vehicle width direction of the front arm portion 21f inwardly in the vehicle width direction and rearwardly. The lower arm 21 as a whole has a substantially L shape in plan view.

As shown in FIGS. 1, 3, and 4, at the front of the subframe 30, there are provided a pair of left and right sub crash cans 47 that extend from respective front ends of the left and right front-rear frames 31 each via a set plate 42 and a mounting plate 43. A sub bumper beam 48 extending in the vehicle width direction is provided at the front of the sub crash cans 47. The left and right sub crash cans 47 are connected to each other via the sub bumper beam 48.

As shown in FIGS. 4, 5, and 7 to 10, each front-rear frame 31 includes a rear horizontal portion 39a extending substantially horizontally in the vehicle front-rear direction, an inclined portion 39b extending from a front end of the rear horizontal portion 39a inclinedly frontward and upward, and a front horizontal portion 39c extending from a front end of the inclined portion 39b substantially horizontally frontward in the vehicle.

Figure 5:
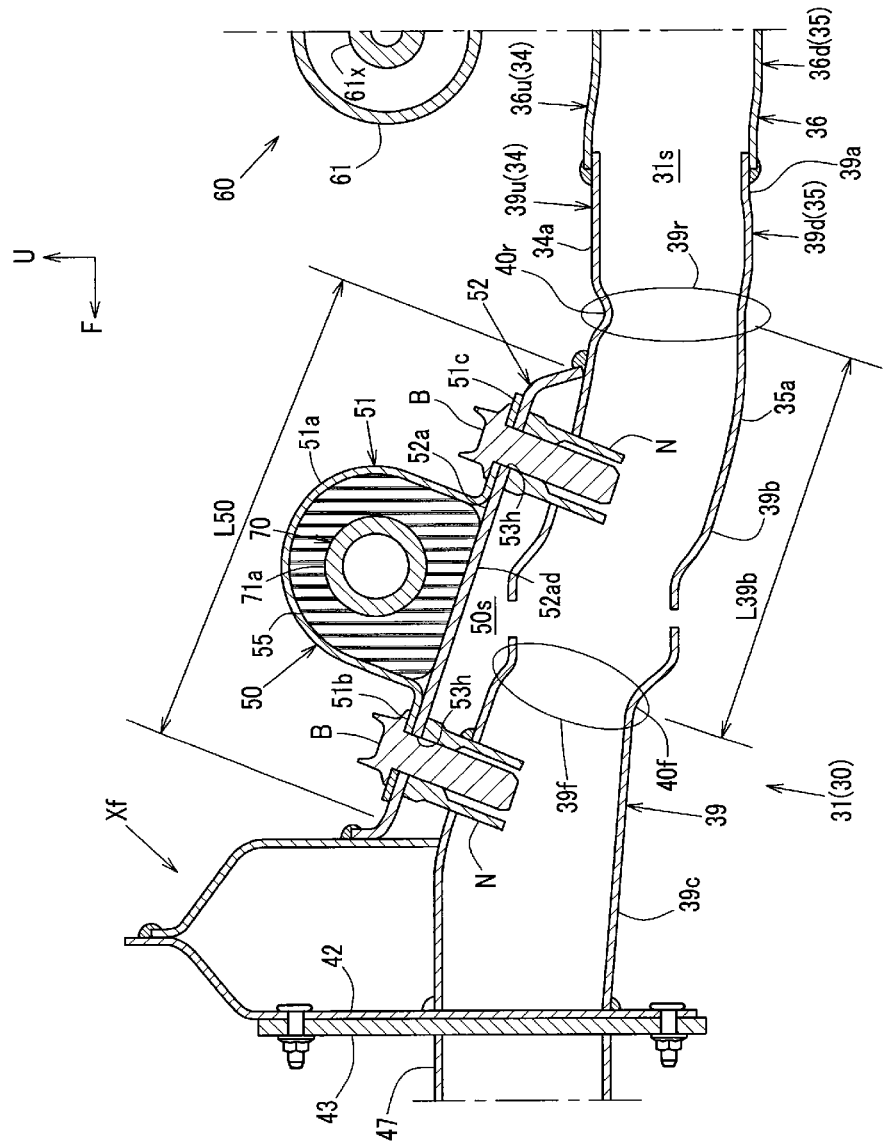
FIG. 5 is a sectional view of major parts taken along the line A-A in FIG. 2.
Figure 7:
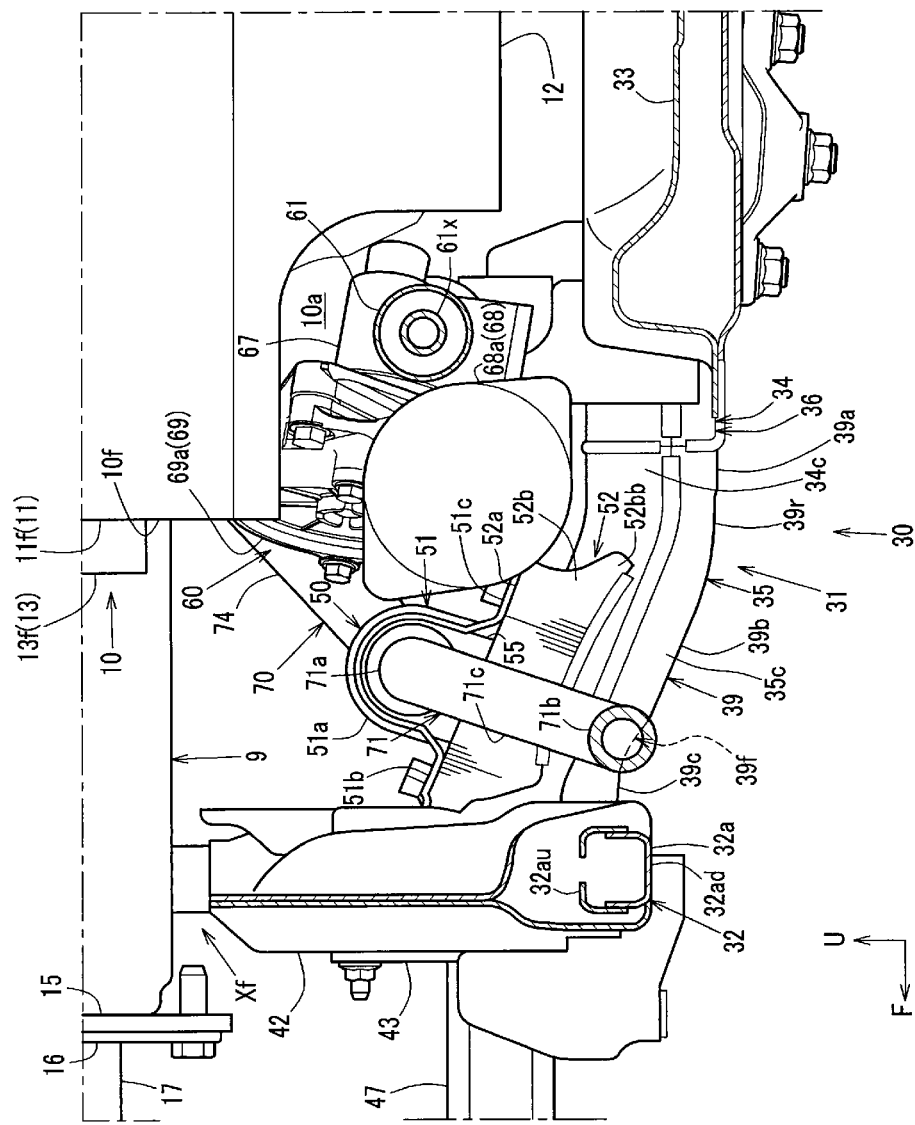
FIG. 7 is a sectional view of major parts taken along the line C-C in FIG. 2.

In the front-rear frame 31, both of a boundary portion 39r between the rear horizontal portion 39a and the inclined portion 39b and a boundary portion 39f between the inclined portion 39b and the front horizontal portion 39c are bent-formed. Here, the boundary portion 39r between the rear horizontal portion 39a and the inclined portion 39b is defined as a rear boundary portion 39r (also referred to as a rear bent portion 39r), and the boundary portion 39f between the inclined portion 39b and the front horizontal portion 39c is defined as a front boundary portion 39f (also referred to as a front bent portion 39f). As shown in FIGS. 4, 5, and 7, the rear boundary portion 39r is formed to protrude in a front downward direction in vehicle side view, and the front boundary portion 39f is formed to protrude in a rear upward direction in vehicle side view.

As shown in FIGS. 4 and 7, each front-rear frame 31 is disposed such that a rear end of the inclined portion 39b, namely the rear boundary portion 39r is at substantially the same position as the front end 10f of the longitudinally installed engine 10 in the vehicle front-rear direction or is positioned frontward of the front end 10f of the engine 10 in the vehicle.

In the present embodiment, the rear boundary portion 39r is disposed at substantially the same position as the front end 10f of the engine 10 in the vehicle front-rear direction, and at least the front boundary portion 39f is positioned frontward of the front end 10f of the engine 10 in the vehicle. It should be noted that the front end 10f of the engine 10 in the present embodiment refers to a front side of the engine body portion, namely the front side 11f of the cylinder block 11.

Disposing the front boundary portion 39f frontward of the front end 10f of the engine 10 and forming the front horizontal portion 39c and the rear horizontal portion 39a such that they are offset (shifted) from each other in the up-down direction and the front-rear direction in this manner allows the front-rear frame 31 to be bent and deformed into a Z shape in vehicle side view in the event of a front-end collision, which in turn allows for increased energy absorption by the subframe 30.

As shown in FIGS. 5 and 8 to 10, the rear boundary portion 39r of each front-rear frame 31 is formed with a recess 40r extending in the vehicle width direction, and the front boundary portion 39f of each front-rear frame 31 is formed with a recess 40f extending in the vehicle width direction.

Figure 8:
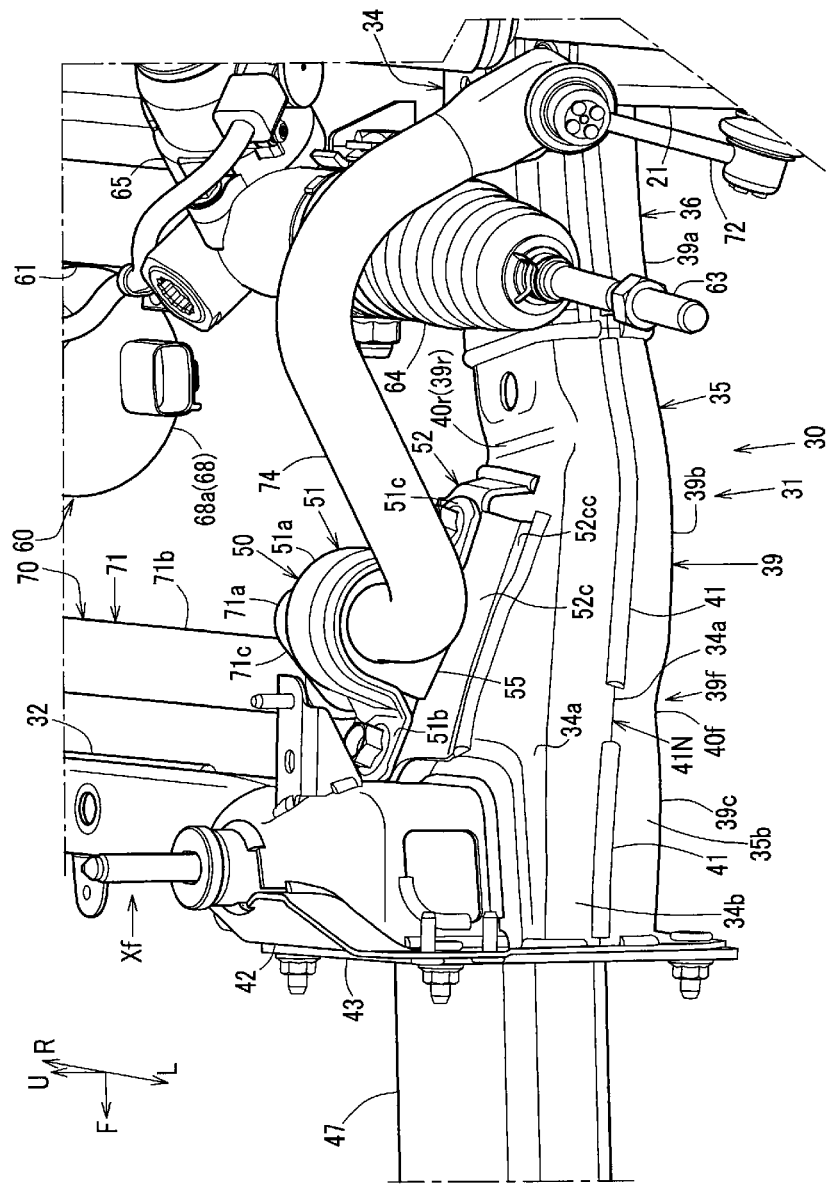
FIG. 8 is an enlarged view of major parts as viewed in the direction of an arrow D1 in FIG. 4 and in the direction of an arrow D2 in FIG. 6.
Figure 9:
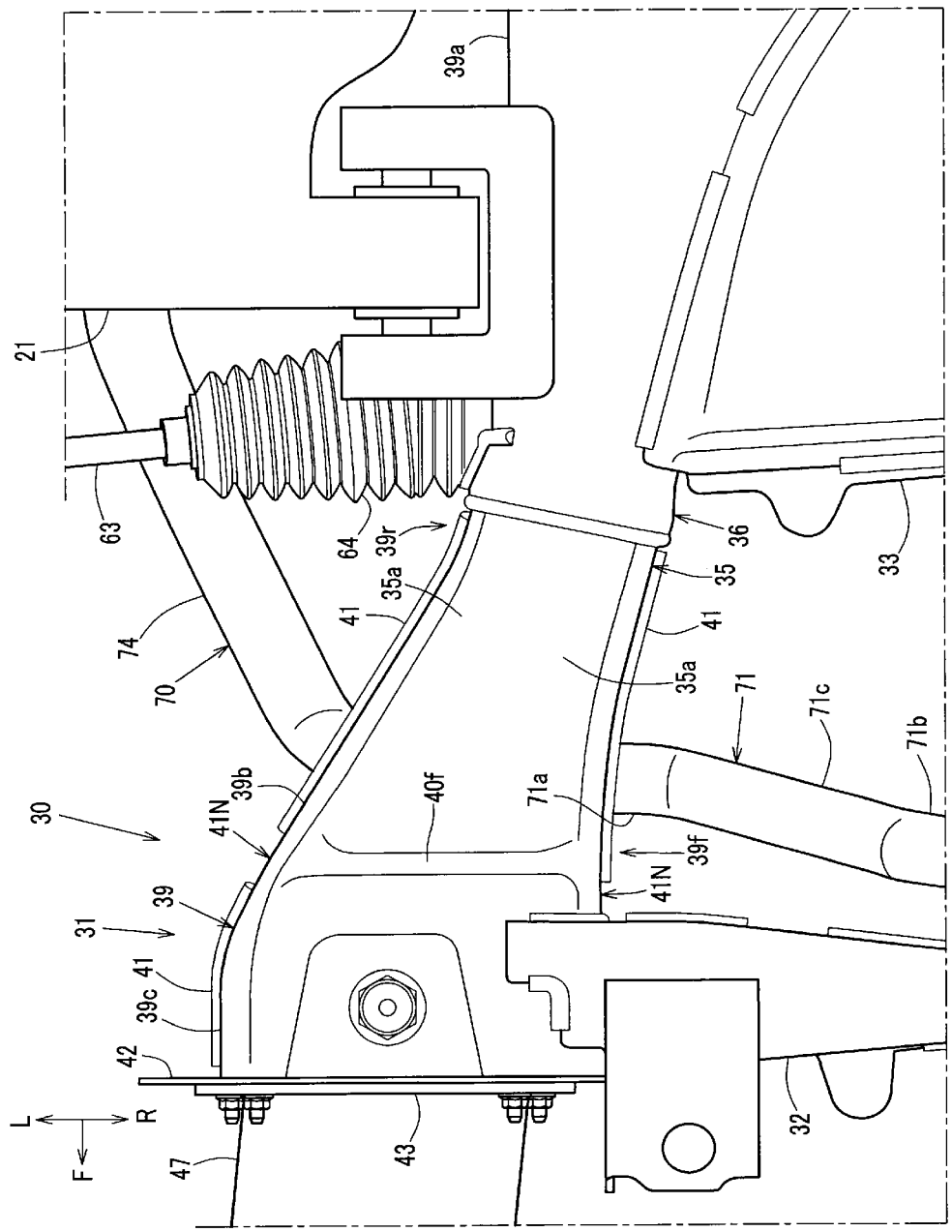
FIG. 9 is a bottom view of major parts as viewed in the direction of an arrow E1 in FIG. 4 and in the direction of an arrow E2 in FIG. 6.
Figure 10:
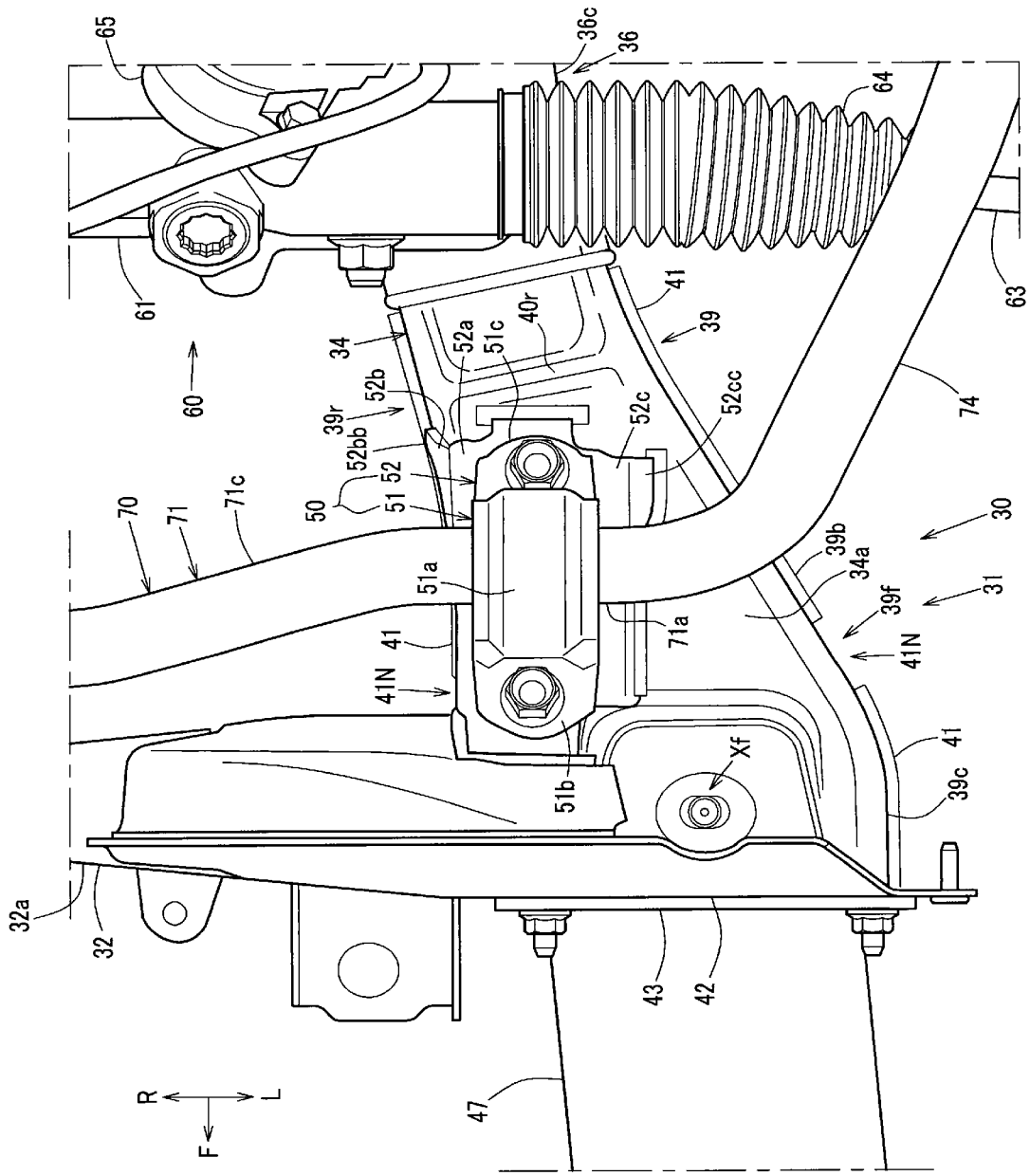
FIG. 10 is a plan view of major parts as viewed in the direction of the arrow D1 in FIG. 4 and in the direction of an arrow F1 in FIG. 6.

Of these recesses 40f, 40r, the recess 40r on the rear side formed in the rear boundary portion 39r (hereinafter also referred to as the "rear recess 40r") is formed on a lower wall 35a of the front-rear frame 31 so as to face upward as shown in FIGS. 5, 8, and 10, and of these recesses 40f, 40r, the recess 40f on the front side formed in the front boundary portion 39f (hereinafter also referred to as the "front recess 40f") is formed on an upper wall 34a of the front-rear frame 31 so as to face downward as shown in FIGS. 5 and 9.

While it is preferable that both of the recesses 40f, 40r be provided respectively in the rear boundary portion 39r and the front boundary portion 39f as in the present embodiment, a configuration is also possible in which the recess is provided in at least one of the rear boundary portion 39r and the front boundary portion 39f.

As shown in FIGS. 3 and 9, each front-rear frame 31 is structured such that the rear horizontal portion 39a is positioned on a vehicle-width-direction inner side relative to the front end of the front horizontal portion 39c and the front-rear frame 31 is gradually positioned toward a vehicle-width-direction outer side from the front end of the rear horizontal portion 39a to the front end of the front horizontal portion 39c.

In the present embodiment, the left and right inclined portions 39b extend inclinedly in the up-down direction such that they are located upward as they go frontward as described above (see FIG. 7), and additionally, they extend inclinedly in the vehicle width direction too such that a distance between them in the vehicle width direction gradually widens as they go frontward, as shown in FIG. 3.

As shown in FIGS. 5, 7, and 8, each front-rear frame 31 has an upper and lower divided structure that is composed of an upper member 34 having a substantially U-shaped cross section opening downward and a lower member 35 having a substantially U-shaped cross section opening upward.

The upper member 34 includes the upper wall 34a (see FIGS. 8 and 10) and an outer wall 34b (see FIG. 8) and an inner wall 34c (see FIG. 7) in the vehicle width direction, and the lower member 35 includes the lower wall 35a (see FIG. 9) and an outer wall 35b (see FIG. 8) and an inner wall 35c (see FIG. 7) in the vehicle width direction.

As shown in FIGS. 8 to 10, the outer wall 34b of the upper member 34 and the outer wall 35b of the lower member 35 of the front-rear frame 31, and the inner wall 34c of the upper member 34 and the inner wall 35c of the lower member 35 of the front-rear frame 31 are joined by arc welding and the like each along the vehicle front-rear direction.

As a result of this formation of joined portions 41, which respectively join inner wall portions and outer wall portions in the vehicle width direction of the upper member 34 and the lower member 35 (see FIGS. 9 and 10), the front-rear frame 31 is formed therein a closed cross-section 31s that is continuous in the vehicle front-rear direction (see FIG. 5).

However, as shown in FIGS. 8 to 10, at a portion in the vehicle front-rear direction of the front-rear frame 31 overlapping (lapping) a stabilizer mounting bracket 50 (described later), the front-rear frame 31 is provided with an unjoined area 41N on both inner and outer sides thereof in the vehicle width direction, where the joined portion 41 is partially absent.

In other words, the aforementioned front-rear frame 31 includes a body member 36 extending in the vehicle front-rear direction and an extended member 39 extending frontward in the vehicle from a front end of the body, as shown in FIGS. 3 to 5 and 7 to 10.

The rear horizontal portion 39a corresponds to a rear portion of the extended member 39 and the body member 36 and is formed substantially horizontally in the vehicle front-rear direction over the rear portion of the extended member 39 and the body member 36. The inclined portion 39b corresponds to an intermediate portion in the vehicle front-rear direction of the extended member 39 and its nearby areas around the intermediate portion, and the front horizontal portion 39c corresponds to a front portion of the extended member 39.

A more detailed description will be given of the upper and lower divided structure of the front-rear frame 31. As shown in FIG. 5, the body member 36 has an upper and lower divided structure that is composed of an upper member 36u having a substantially U-shaped cross section opening downward and a lower member 36d having a substantially U-shaped cross section opening upward. The extended member 39 has an upper and lower divided structure that is composed of an upper member 39u having a substantially U-shaped cross section opening downward and a lower member 39d having a substantially U-shaped cross section opening upward.

In the front-rear frame 31, at a front portion of the rear horizontal portion 39a in the vehicle front-rear direction, where the boundary portion between the body member 36 and the extended member 39 is located, a front end of the body member 36 and a rear end of the extended member 39 are joined together by welding and the like along their circumferential direction (see FIGS. 7 to 10). That is, as shown in FIG. 5, the upper member 36u of the body member 36 and the upper member 39u of the extended member 39 constitute the upper member 34 of the front-rear frame 31, and the lower member 35d of the body member 36 and the lower member 39d of the extended member 39 constitute the lower member 35 of the front-rear frame 31.

The above upper members 36u, 39u and lower members 36d, 39d provided respectively to the body member 36 and the extended member 39 have a relation in strength between them. The relationship is set as follows.

That is, the strength of the lower member 39d of the extended member 39 is relatively smallest, and the strength of the upper member 39u of the extended member 39 is set larger than the strength of the lower member 39d. The strength of the upper member 36u and the lower member 36d of the body member 36 is set larger than the strength of the upper member 39u.

The strength of the upper member 36u and the lower member 36d of the body member 36 is set almost equal to each other. As such, constituents of the front-rear frames 31 have the relationship in strength between them, which is given by, for example, varying materials or plate thickness or applying heat treatment.

As described above, the front-rear frame 31 is provided with the unjoined area 41N at its portion in the vehicle front-rear direction overlapping the stabilizer mounting bracket 50 (described later), and is given a relatively lower strength at its front lower portion (the lower member 39d) in particular. Additionally, as described above, the front-rear frame 31 is formed with the front recess 40f on the lower wall 35a in the front boundary portion 39f and formed with the rear recess 40r on the upper wall 34a in the rear boundary portion 39r; the front recess 40f and the rear recess 40r serve as a breakage starter for inward bending deformation of the lower wall 35a and the upper wall 34a, respectively, when the front-rear frame 31 is bent and deformed into a Z shape in vehicle side view in the event of a front-end collision. This configuration more reliably ensures that the front-rear frame 31 is bent and deformed into a Z shape in vehicle side view in the event of a front-end collision.

As shown in FIGS. 1 and 4, the subframe 30 includes a front vehicle body mounting portion Xf, an intermediate vehicle body mounting portion Xm, and a rear vehicle body mounting portion Xr in each of the front-rear frames 31 on both sides. The subframe 30 is mounted to and supported by the front side frames 9 by these three vehicle body mounting portions on each of the left and right sides.

The front vehicle body mounting portion Xf and the rear vehicle body mounting portion Xr are fastened and fixed from a front end of the extended member 39 and a rear end of the body member 36, respectively, to corresponding portions of a bottom side of each front side frame 9 by fastening members.

As shown in FIGS. 1, 2, and 4, the intermediate vehicle body mounting portion Xm includes a mount bracket 80 vertically disposed at an intermediate portion in the vehicle front-rear direction of the body member 36, and is fastened and fixed to a corresponding portion of the bottom side of each front side frame 9 via the mount bracket 80 by a fastening member.

Besides as the mounting portion to mount the subframe 30 to the vehicle body, each mount bracket 80 also serves as a member to mount and support the engine 10. That is, as shown in FIGS. 1 to 3 and 6, the subframe 30 mounts and supports the engine 10, which is a vehicle driving apparatus, via an engine mount portion 81 of the mount bracket 80.

As shown in FIGS. 1 to 3 and 7, the front cross member 32 extends substantially linearly between front ends of the pair of left and right extended members 39, namely between the left and right front horizontal portions 39c so as to connect the front ends in the vehicle width direction. The front cross member 32 is disposed at a position spaced frontward from the front end 10f of the engine 10.

As shown in FIGS. 3 and 7, the center cross member 33 extends substantially linearly between the pair of left and right body members 36 at their portions from the front end to a near-rear portion so as to connect these portions in the vehicle width direction.

By the way, as shown in FIGS. 1 to 4 and 6 to 8, the front vehicle body structure (the structure around the subframe 30 of the present embodiment) includes an electric power steering apparatus 60. The electric power steering apparatus 60 is a so-called dual-pinion electric power steering apparatus and, as shown in FIGS. 1, 2, 6, 8, and 10, includes a substantially cylindrical rack housing 61 extending in the vehicle width direction. As shown in FIGS. 5 and 7, a rack shaft 61x is accommodated in the rack housing 61 such that the rack shaft 61x can slide in the vehicle width direction.

As shown in FIGS. 1 to 3 and 6, both ends of the rack shaft 61x protruding from openings on both ends of the rack housing 61 are connected with respective tie rods 63 each via a joint portion. In other words, each tie rod 63 protrudes outward of the vehicle from a dust boot 64 covering the joint portion. Movement of the rack shaft 61x causes the tie rods 63 to move, which in turn causes the front wheels of the vehicle to turn via a turning mechanism.

Figure 6:
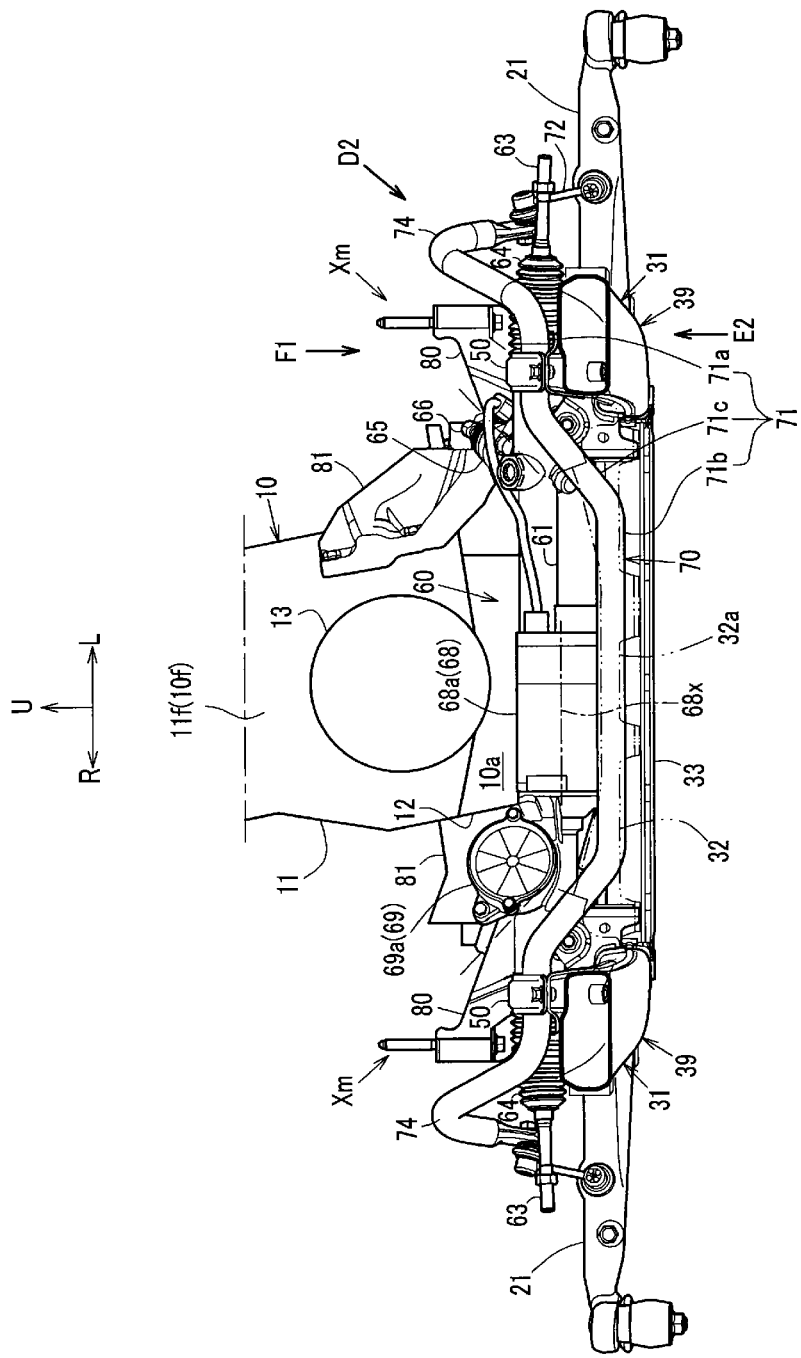
FIG. 6 is a sectional view of major parts taken along the line B-B in FIG. 2.

As shown in FIGS. 1, 2, and 6, the rack housing 61 is provided on its one side in the vehicle width direction (left side of the vehicle) with an input shaft 66 receiving a steering force from a steering shaft and with a steering gear box 65. The input shaft 66 is connected via a universal joint to the steering shaft to which a steering wheel is integrally attached. Also, the input shaft 66 is rotatably supported via a bearing and connected to a steering pinion inside the steering gear box 65.

The steering pinion meshes with the rack shaft 61x (see FIG. 5), and the steering force transmitted to the input shaft 66 by rotation of the steering shaft causes the steering pinion to rotate, which in turn causes the rack shaft 61x to axially slide to the left and right because of the meshing between the steering pinon and the rack shaft 61x.

As shown in FIGS. 2 and 7, the rack housing 61 is formed on its other side in the vehicle width direction (right side of the vehicle) with an auxiliary gear box 67, and a second auxiliary pinion meshing with the rack shaft 61x is accommodated in the auxiliary gear box 67.

As shown in FIGS. 1 to 3, the rack housing 61 is provided on its other side in the vehicle width direction (right side of the vehicle) with an assist motor 68 and a worm gear mechanism 69.

As a reducer for the assist motor 68, the worm gear mechanism 69 reduces rotation transmitted from the assist motor 68 and is interposed between the assist motor 68 and the second auxiliary pinion as shown in FIGS. 1 to 3. The worm gear mechanism 69 is coaxially connected to a spindle of the assist motor 68 and meshes with the second auxiliary pinion.

The electric power steering apparatus 60 assists a driver's steering operation by transmitting a driving force of the assist motor 68, which is controlled according to steering torque of the steering wheel, to the rack shaft 61x via the worm gear mechanism 69 and the second auxiliary pinion while the steering force of the driver's steering is transmitted to the rack shaft 61x via the steering pinion.

As shown in FIGS. 1 and 4, the above electric power steering apparatus 60 is disposed at the front of the engine 10 and between the front side frame 9 and the subframe 30 in the up-down direction.

When the engine 10 is a longitudinal type as in the present embodiment, the transmission 14 is disposed on the rear side of the engine 10 (see FIG. 2), and accordingly layout space limitations on the rear side of the engine 10 restrict vehicle components around the engine 10 including the electric power steering apparatus 60 from being disposed on the rear side of the engine 10. This, in the present embodiment, the above electric power steering apparatus 60 is disposed in the space that is frontward of the front end 10f of the engine 10 in the vehicle front-rear direction and in which the subframe 30 is to be actively deformed in the event of a front-end collision.

Specifically, as shown in FIGS. 3 and 6, the assist motor 68 is transversely disposed substantially at the center between the left and right front-rear frames 31 (substantially at the center in the vehicle width direction) such that an axis 68x of a cylindrical case 68a extends along the vehicle width direction.

The worm gear mechanism 69 (reducer for the assist motor 68) is disposed on one side (right side in the present embodiment) of this assist motor 68 and, as described above, coupled with the spindle protruding from the assist motor 68 to the worm gear mechanism 69 as described above.

That is, as shown in FIGS. 1, 3, and 6, the worm gear mechanism 69 is disposed between the assist motor 68 and the right front-rear frame 31 and substantially at the same height as the assist motor 68. Specifically, as shown in FIG.

6, the worm gear mechanism 69 is disposed with its lower end positioned slightly higher than a lower end of the assist motor 68.

A housing 69a of the worm gear mechanism 69 is formed in a cylindrical shape having a substantially flat front wall. The housing 69a of the worm gear mechanism 69 is disposed with its front wall oriented vertically and facing frontward of the vehicle.

As shown in FIGS. 6 and 7, a retracted portion 10a formed by retracting a front face of the oil pan 12 rearward relative to the front side 11f of the cylinder block 11 is provided below the front side of the engine 10.

Below the front side of the engine 10, the retracted portion 10a is defined as a recessed space that extends rearward from the front side 11f of the cylinder block 11 and upward from a bottom side of the oil pan 12 and opens frontward and downward, and is formed entirely below the front side of the engine 10 in the vehicle width direction.

At least the assist motor 68 and the rack housing 61 of the electric power steering apparatus 60 is disposed in the retracted portion 10a below the front side of the engine 10.

As shown in FIGS. 1 to 3, 5 to 8, and 10, a stabilizer 70 extending in the vehicle width direction is provided frontward of the electric power steering apparatus 60. The stabilizer 70 is disposed frontward of the engine 10 for the same reason as the vehicle components around the engine 10 being disposed frontward of the engine 10 as described above; when the engine 10 is a longitudinal type, there are layout space limitations on the rear side of the engine 10.

The stabilizer 70 is integrally formed of a torsion portion 71 extending in the vehicle width direction and a pair of left and right arm portions 74 each connected to a knuckle via a stabilizer link 72.

Each arm portion 74 is extended rearward in the vehicle from an outer end in the vehicle width direction of the torsion portion 71 so as to straddle from above the dust boot 64 that covers a rack end of the steering gear box 65.

More specifically, each arm portion 74 is extended from an outer end in the vehicle width direction of the torsion portion 71 rearward and upward and then rearward and downward in vehicle side view.

The torsion portion 71 extends linearly in the vehicle width direction along the front cross member 32 near a rear side of the front cross member 32 in vehicle plan view, and is formed longer than a distance between the left and right front-rear frames 31 such that left and right ends of the torsion portion 71 substantially horizontally cross the respective left and right front-rear frames 31 from above.

The torsion portion 71 is integrally formed of a pair of left and right outer horizontal portions 71a located on the vehicle-width-direction outer side and extending horizontally in the vehicle width direction, an inner horizontal portion 71b located lower than the pair of left and right outer horizontal portions 71a and between them in the vehicle width direction and extending horizontally in the vehicle width direction, and inclined portions 71c each connecting, in the vehicle width direction, an inner end in the vehicle width direction of the corresponding outer horizontal portion 71a and an outer end in the vehicle width direction of the inner horizontal portion 71b.

Each outer horizontal portion 71a corresponds to a linear portion that crosses, from above and in the vehicle width direction, the corresponding front-rear frame 31 extending in the vehicle front-rear direction. Each inclined portion 71c extends linearly such that it is inclined downward from the inner end in the vehicle width direction of the corresponding outer horizontal portion 71a toward the vehicle-width-direction inner side. The inner horizontal portion 71b is substantially at the same height as the front cross member 32, which is disposed lower than the upper wall 34a of the front-rear frame 31, and extends linearly in the vehicle width direction along the front cross member 32.

The stabilizer 70 is provided frontward of the assist motor 68 (see FIGS. 1 and 3) and, as shown in FIGS. 1 and 6, is offset from the assist motor 68 in the up-down direction (downward direction in the present embodiment) so as not to overlap the assist motor 68 in vehicle front view.

Specifically, the inner horizontal portion 71b is disposed such that while it partially overlaps the assist motor 68 in the vehicle width direction, an upper end of the inner horizontal portion 71b is located below a lower end of the assist motor 68 as shown in FIGS. 1, 6, and 7. That is, the inner horizontal portion 71b is offset downward from the assist motor 68.

The stabilizer 70 is mounted on the upper walls 34a of the respective front-rear frames 31 via stabilizer mounting brackets 50 (described later) in the vehicle width direction particularly in consideration of positions of the front wheels and bending formability of the stabilizer 70.

Specifically, as shown in FIG. 10, the stabilizer mounting bracket 50 is mounted at an inside position in the vehicle width direction on the upper wall 34a of the corresponding front-rear frame 31.

Meanwhile, as shown in FIG. 6, at least the left inclined portion 71c of the pair of left and right inclined portions 71c of the stabilizer 70 is inclinedly formed at the steepest inclination angle possible that allows the inclined portion 71c to be bent-formed from the above mounting position on the upper wall 34a of the corresponding front-rear frame 31 downward and toward the vehicle-width-direction inner side.

Thus, at least the left inclined portion 71c of the pair of left and right inclined portions 71c is offset from the worm gear mechanism 69, which is provided on the left side of the assist motor 68, to the vehicle-width-direction outer side in vehicle front view (see FIG. 6).

In other words, the stabilizer 70 is extended below and on the vehicle-width-direction outer side of the assist motor 68 and the worm gear mechanism 69 so as to bypass them so that its torsion portion 71 (in particular, the inner horizontal portion 71b and the inclined portion 71c) does not overlap the assist motor 68 and the worm gear mechanism 69 in vehicle front view.

In the configuration in which the electric power steering apparatus 60 and the stabilizer 70 are disposed frontward of the engine 10, this helps avoid reducing a space frontward of the engine 10 in the vehicle front-rear direction that is necessary for the subframe 30 to be deformed into a Z shape in vehicle side view as a result of these vehicle components (the electric power steering apparatus 60 and the stabilizer 70) around the engine 10 interfering with each other in the vehicle front-rear direction at the front of the engine 10 in the event of a front-end collision.

As shown in FIGS. 1, 2, 4 to 8, and 10, left and right ends of the torsion portion 71 of the stabilizer 70 are respectively mounted on the upper walls 34a of the left and right front-rear frames 31 each via the stabilizer mounting bracket 50.

Each stabilizer mounting bracket 50 is mounted on the upper wall 34a of the corresponding front-rear frame 31, mainly on an upper wall (34a) of the inclined portion 39b in the vehicle front-rear direction.

As shown in FIGS. 4, 5, 7, 8, and 10, each stabilizer mounting bracket 50 includes a stabilizer mounting bracket upper member 51 (hereinafter abbreviated as a "bracket upper member 51") and a stabilizer mounting bracket lower member 52 (hereinafter abbreviated as a "bracket lower member 52"). The bracket upper member 51 and the bracket lower member 52 have a substantially equal longitudinal length and, as shown in FIG. 5 in particular, are formed longer than a length (L39b) of the inclined portion 39b in its extending direction.

The bracket lower member 52 is integrally formed of a horizontal upper wall 52a (see FIGS. 5 and 10), an inner wall 52b extending downward from an inner end in the vehicle width direction of the upper wall 52a (see FIGS. 7 and 10), and an outer wall 52c extending downward from an outer end in the vehicle width direction of the upper wall 52a (see FIGS. 8 and 10), and its cross-section perpendicular to the vehicle front-rear direction is formed in a U shape opening downward.

As shown in FIGS. 7 and 10, the inner wall 52b is integrally formed at its lower portion with an inner end flange portion 52bb extending downward and, as shown in FIGS. 8 and 10, the outer wall 52c is integrally formed at its lower portion with an outer end flange portion 52cc extending to the vehicle-width-direction outer side.

The inner end flange portion 52bb of the inner wall 52b of the bracket lower member 52 is joined to the inner wall (34c) of the front-rear frame 31 and the outer end flange portion 52cc of the outer wall 52c of the bracket lower member 52 is joined to the upper wall 34a of the front-rear frame 31 each by welding (see FIGS. 7, 8, and 10).

Thus, the bracket lower member 52 is formed in a pedestal shape with the upper wall 52a raised relative to the upper wall 34a of the front-rear frame 31 (see FIG. 5).

In other words, as shown in FIG. 5, a bottom side of the upper wall 52a of the bracket lower member 52 is separated above from the upper wall 34a of the front-rear frame 31, and a gap 50s in the up-down direction is formed between the upper wall 52a and the upper wall 34a of the front-rear frame 31. The gap 50s extends along the whole length of the bracket lower member 52 in the vehicle front-rear direction.

The upper wall 52a of the bracket lower member 52 is formed on its front and rear sides with mounting holes 53h for fastening and fixing the bracket upper member 51 from above using a bolt B of a fastening member, and a weld nut N of the fastening member is fixed around each of the front and rear mounting holes 53 from the bottom side of the upper wall 52a.

The bracket upper member 51 is formed substantially in an omega shape in vehicle side view. Specifically, as shown in FIGS. 5, 7, 8, and 10, the bracket upper member 51 is integrally formed of a holding portion 51a holding the cylindrical stabilizer 70 and having an inverted U-shaped cross-section perpendicular to the vehicle width direction, and front and rear flange portions 51b, 51c respectively extended frontward and rearward from front and rear ends of the holding portion 51a.

The bracket upper member 51 is fastened and fixed to the upper wall 34a of the front-rear frame 31 at the front and rear flange portions 51b, 51c via the bracket lower member 52 and using the fastening member composed of the bolt B and the weld nut N.

As shown in FIGS. 5, 7, and 8, the stabilizer 70 in this state has its outer horizontal portion 71a of the torsion portion 71 in the vehicle width direction held between the holding portion 51a of the bracket upper member 51 and the upper wall 52a of the bracket lower member 52 from above and below via a cushioning member 55. In other words, the stabilizer 70 is mainly mounted on and supported by the inclined portion 39b of the front-rear frame 31 via the stabilizer mounting bracket 50.

Here, as shown in FIG. 5, the stabilizer mounting bracket 50 extends in the vehicle front-rear direction along the upper wall 34a of the front-rear frame 31, and its length (L50) in the vehicle front-rear direction is substantially equal to, or longer than, the length of the inclined portion 39b (L39b) in its extending direction, as described above. In the present embodiment, the stabilizer mounting bracket 50 is formed slightly longer than the length of the inclined portion 39b (L39b) in its extending direction (L50>L39b).

Also, as described above, the stabilizer 70 is disposed such that its outer horizontal portion 71a crosses the front-rear frame 31 at the inclined portion 39b, namely overlaps the inclined portion 39b in the vehicle front-rear direction (see FIGS. 4, 5, 7, and 8). Thus, the stabilizer mounting bracket 50 is fastened and fixed to the upper wall 34a of the front-rear frame 31 such that the stabilizer mounting bracket 50 holds the stabilizer 70 by its holding portion 51a right above the inclined portion 39b.

However, the stabilizer mounting bracket 50, which has a longer longitudinal length (length in its extending direction) than that of the inclined portion 39b of the front-rear frame 31, is fastened and fixed at a position that is slightly offset frontward relative to the upper wall (34a) of the inclined portion 39b (see FIG. 5 in particular).

Specifically, the stabilizer mounting bracket 50 is disposed such that its front flange portion 51b (or a fastened part of the front flange portion 51b) is positioned frontward of the front boundary portion 39f and its rear flange portion 51c (or a fastened part of the rear flange portion 51c) is positioned frontward of the rear boundary portion 39r.

This results in the stabilizer mounting bracket 50 being disposed to only overlap the front boundary portion 39f of the front and rear boundary portions 39f, 39r in the vehicle front-rear direction of the front-rear frame 31 (see the same figure).

Figure 11A:
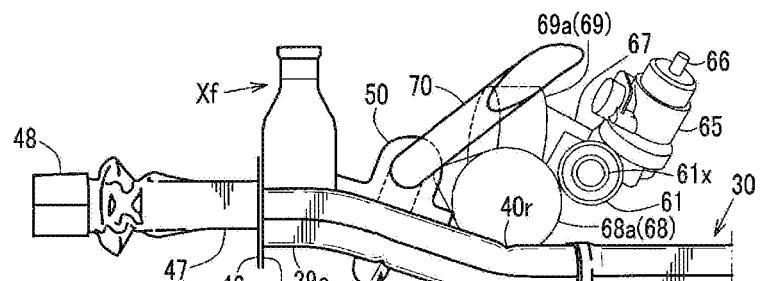
FIGS. 11A to 11D are side views showing a deformed state of the subframe in the event of a front-end collision.
Figure 11B:
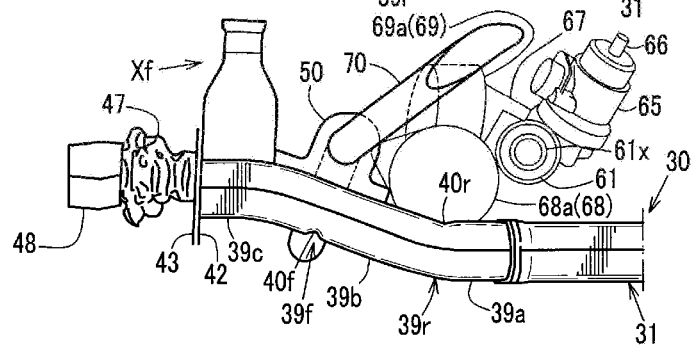
Figure 11C:
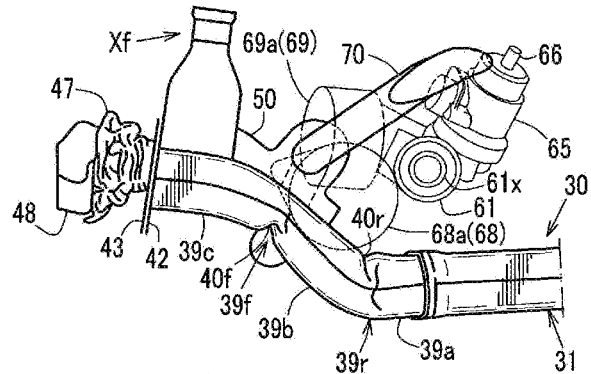

When the front-rear frame 31 is deformed into a Z shape in vehicle side view in the event of a front-end collision, the rear boundary portion 39r is deformed such that its upper wall 34a is bent inward (see FIGS. 11B and 11C). On the other hand, the front boundary portion 39f is deformed such that its upper wall 34a is bent outward (see the same figures).

Comparing disposing the stabilizer mounting bracket 50 so as to cover the upper wall 34a of the front boundary portion 39f, which is bent outward in the event of a front-end collision, and disposing the stabilizer mounting bracket 50 so as to cover the upper wall 34a of the rear boundary portion 39r, which is bent inward in the event of a front-end collision, the former can reduce an influence of the stabilizer mounting bracket 50 that inhibits bending deformation of the corresponding boundary portion in the event of a front-end collision.

Thus, in the present embodiment, the stabilizer mounting bracket 50 is disposed so as to only overlap the front boundary portion 39f of the front and rear boundary portions 39f, 39r in the vehicle front-rear direction of the front-rear frame 31 as described above, in the structure in which the stabilizer 70 is held right above the inclined portion 39b via the stabilizer mounting bracket 50, whose mounting span (L50) in the vehicle front-rear direction is longer than the longitudinal length (L39b) of the inclined portion 39b (length in its extending direction) of the front-rear frame 31 (see FIG. 5).

However, as shown in FIG. 5, while the upper wall 34a of the front boundary portion 39f is covered with the stabilizer mounting bracket 50 from above, the upper wall 52a of the bracket lower member 52 does not directly contact the upper wall 34a around the front boundary portion 39f but is separated above from it as described above, and thus the gap 50s in the up-down direction is secured between these upper walls 34a, 52a.

This minimizes the influence of the upper wall 52a of the bracket lower member 52 that inhibits outward bending of the upper wall 34a of the front boundary portion 39f at its onset in the event of a front-end collision; such influence would otherwise take place when, for example, the upper wall 52a of the bracket lower member 52 is disposed in close contact from above with the upper wall 34a around the front boundary portion 39f.

Thus, while the upper wall 34a of the front boundary portion 39f is covered from above with the stabilizer mounting bracket 50, the front boundary portion 39f can function as a starting point of breakage in the event of a front-end collision.

Also, as shown in FIGS. 1 to 3, 6, and 7, the front cross member 32 and the stabilizer 70 described above are disposed adjacent to each other in the vehicle front-rear direction. The front cross member 32 includes, at its center in the vehicle width direction, an inner horizontal portion 32a extending substantially horizontally and substantially linearly in the vehicle width direction. The inner horizontal portion 32a of the front cross member 32 and the inner horizontal portion 71b of the stabilizer 70 are disposed substantially at the same height so as to overlap each other in the up-down direction (see FIGS. 6 and 7).

While at least a part of the inner horizontal portion 32a of the front cross member 32 in the vehicle width direction coincides with the assist motor 68 (see FIG. 1), the inner horizontal portion 32a is offset downward from the assist motor 68, similarly to the inner horizontal portion 71b of the stabilizer 70 (see FIGS. 1, 6, and 7).

However, the inner horizontal portion 32a of the front cross member 32 of the present embodiment is not entirely offset downward but a top side 32au of the inner horizontal portion 32a is set lower in height than the lower end 68d of the assist motor 68, as shown in FIG. 7.

Specifically, while the top side 32au of the inner horizontal portion 32a of the front cross member 32 is positioned lower than the lower end of the assist motor 68, a bottom side 32ad of the inner horizontal portion 32a of the front cross member 32 is formed without being lowered in position.

Thus, the inner horizontal portion 32a of the front cross member 32 is formed such that only the top side 32au is lowered in position without the bottom side 32ad being lowered, or in other words, is formed to have a lower cross-sectional height (smaller thickness in the up-down direction) so as to lower the top side 32au in position; as such, the front cross member 32 itself is set to meet a predetermined minimum ground clearance.

Figure 11D:
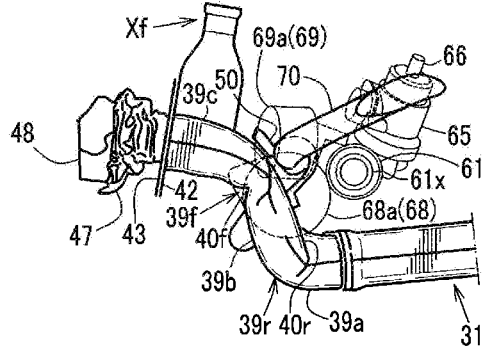
Figure 12:
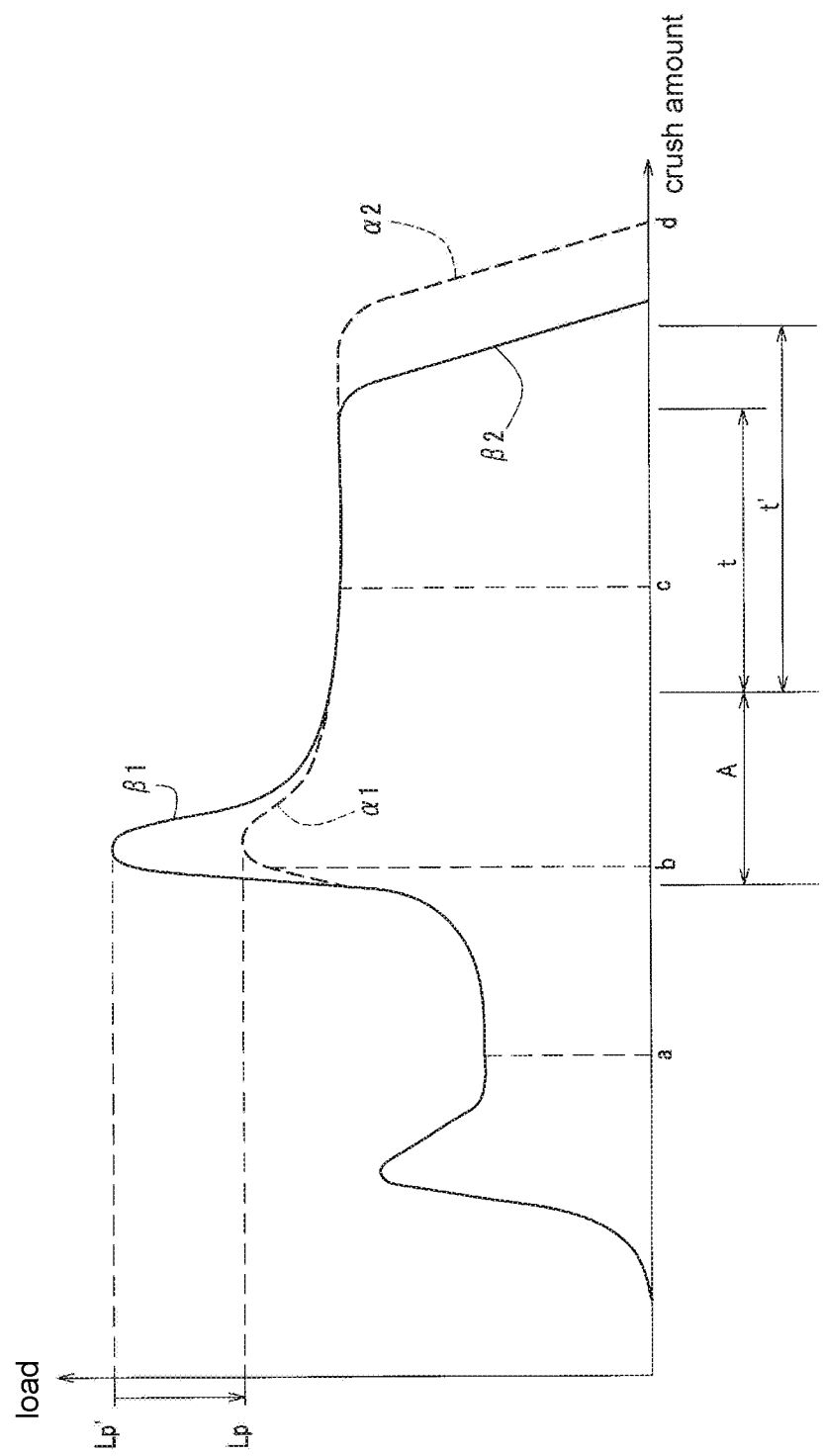
FIG. 12 is a graph showing relationship between a load on the front vehicle body structure in the event of a front-end collision and a crush amount of the subframe structure.

Referring to FIGS. 11A to 11D and 12, a description will be given of how the above-configured subframe 30 of the front suspension functions. FIGS. 11A to 11D are side views showing a deformed state of the sub bumper beam 48, the sub crash cans 47, and the subframe 30 in the event of full-lap collision (front-end collision). FIG. 12 is a graph showing relationship between a load on the vehicle and a crush stroke of the sub crash can 47 and the subframe 30 in the event of a front-end collision.

As shown in FIG. 11A, upon input of a front-end collision load (impact load toward the rear side of the vehicle) on the sub bumper beam 48, a front portion of each sub crash can 47 is crushed by axial compression. Note that FIG. 11A shows a deformed state of each sub crash can 47 when the crush amount is a in FIG. 12.

As the front-end collision progresses, each sub crash can 47 is crushed over its whole length in the front-rear direction, as shown in FIG. 11B. In other words, FIG. 11B shows a deformed state of each sub crash can 47 when the crush amount is b in FIG. 12.

Some load (energy) of the front-end collision load that cannot be absorbed by the axial compression of the sub crash cans 47 is absorbed mainly by the left and right front-rear frames 31 of the subframe 30 as they are deformed into a Z shape in vehicle side view.

Specifically, immediately after the front-rear frames 31 start to be deformed into a Z shape in vehicle side view, stress concentrates on the front boundary portion 39f and the rear boundary portion 39r of each front-rear frame 31. At that time, as shown in FIG. 12, a load on the vehicle (subframe 30) rises sharply, as a result of which the front-rear frames 31 are elastically deformed such that the front boundary portion 39f and the rear boundary portion 39r are bent.

As shown in period A in FIG. 12, the load on the vehicle rises sharply immediately after the start of deformation of the front-rear frames 31, and upon the deformation of the front-rear frames 31 transitioning to plastic deformation, the load drops to some extent from its peak Lp during the rising phase (hereinafter referred to as a "peak load Lp").

With a high peak load Lp, a large inertia force acts on an occupant in the event of a front-end collision, which in turn increases impact of an inflating airbag on the occupant. For this reason, it is preferable to minimize the peak load Lp to the extent possible.

In the present embodiment, each front-rear frame 31 is formed with the front recess 40f on the lower wall 35a of the front boundary portion 39f and with the rear recess 40r on the upper wall 34a of the rear boundary portion 39r, and these recesses 40f, 40r can provide a starting point of breakage of the front-rear frame 31 in the event of a front-end collision, contributing to lowering the peak load Lp.

Additionally, in the present embodiment, the unjoined area 41N where the upper member 34 and the lower member 35 of the front-rear frame 31 are not joined to each other is provided at the portion in the vehicle front-rear direction of the front-rear frame 31 that overlaps (laps) the robust stabilizer mounting bracket 50 and undergoes breakage deformation during the Z-shape deformation of the front-rear frame 31 in vehicle side view (i.e., the portion near the front boundary portion 39f), and thereby the portion is made relatively vulnerable in the vehicle front-rear direction. Additionally, the strength of the lower member 39d of the extended member 39 is made smaller than that of the upper member 39u. These also contribute to lowering the peak load Lp.

With the above countermeasures taken, the present embodiment reduces the peak load Lp as indicated by a waveform α1 of a dashed line in FIG. 12, as compared to a peak load Lp' that takes place when no countermeasures are taken as indicated by a waveform β1 of a solid line in FIG. 12.

As the front-end collision further progresses, as shown in FIG. 11C, the front-rear frame 31 is further deformed into a Z shape in vehicle side view. Note that FIG. 11C shows a deformed state of the subframe 30 when the crush amount is c in FIG. 12.

Specifically, the front-rear frame 31 is bent and deformed with the above front boundary portion 39f and rear boundary portion 39r as fulcrums such that the front side of the inclined portion 39b rises upward and rearward relative to its rear side. In other words, the front horizontal portion 39c of the front-rear frame 31 is retracted and displaced upward, and the rear horizontal portion 39a (the body member 36) of the front-rear frame 31 has its front side displaced frontward and downward by about 5 to 7 degrees with its rear side as a fulcrum.

Note that the Z-shape deformation of the front-rear frame 31 in vehicle side view refers to deformation in which a front portion of the front-rear frame 31 frontward of the front end 10f of the engine 10, such as the front cross member 32, is retracted and thus the front horizontal portion 39c and the rear horizontal portion 39a are displaced closer to each other in the vehicle front-rear direction while being offset (separated) from each other respectively upward and downward.

Thus, the aforementioned process whereby the front-rear frame 31 is deformed into a Z shape in vehicle side view is merely by way of example; alternatively, only the front horizontal portion 39c of the front-rear frame 31 may be retracted and displaced upward while the front side of the rear horizontal portion 39a (the body member 36) remains undisplaced downward.

As shown in FIG. 12, after the load has dropped to some extent from the peak load Lp (after the period A), the front-rear frame 31 is plastically deformed to stably receive the applied load lower than the peak load Lp, whereby energy is slowly absorbed. Upon the subframe 30 deforming by an amount equal to the crush stroke (i.e., upon the load becoming zero in FIG. 12), the subframe 30 becomes Z-shaped in vehicle side view as shown in FIG. 11D and can fully absorb the energy of the front-end collision. In other words, FIG. 11D shows a deformed state of the subframe 30 when the crush amount is d in FIG. 12.

In the present embodiment, the stabilizer 70 is extended below and on the vehicle-width-direction outer side of the assist motor 68 and the worm gear mechanism 69 so as to bypass them so that its torsion portion 71 (in particular, the inner horizontal portion 71b and the right inclined portion 71c) does not overlap the assist motor 68 and the worm gear mechanism 69 in vehicle front view. This prevents these vehicle components disposed at the front of the engine 10 from interfering with each other in the vehicle front-rear direction in the event of a front-end collision. This, in turn, restrains these vehicle components from inhibiting retraction of the front portion of the subframe 30 at the front of the engine 10 (e.g., the front cross member 32) in the event of a front-end collision.

In other words, the present embodiment ensures a longer time period in which the load lower than the peak load Lp is stably applied as shown by a waveform α2 of a dashed line in FIG. 12, as compared to a waveform β2 of a solid line in FIG. 12 (t'>t).

The waveform β2 of the solid line in FIG. 12 represents characteristics of a configuration in which the vehicle components are simply disposed at the front of the engine 10 with no countermeasures taken, and the waveform α2 of the dashed line in FIG. 12 represents characteristics of the configuration in which countermeasures are in place to restrain the vehicle components from inhibiting retraction of the front portion of the subframe 30 at the front of the engine 10 in the event of a front-end collision as in the present embodiment.

Thus, effective use is made of the space at the front of the engine 10 (space between the stabilizer 70 and the assist motor 68) to facilitate deformation of the subframe 30 into a Z shape in vehicle side view and achieve complete crushing thereof, and this allows the subframe 30 to absorb more energy in the event of a front-end collision.

As shown in FIGS. 1 and 2, the subframe 30 of the front suspension (the subframe structure) of the present embodiment includes, as shown in FIG. 1, the pair of left and right front-rear frames 31 each mounted with the lower arm 21 (suspension arm) and the front cross member 32 as a transverse member connecting front portions of the front-rear frames 31. As shown in FIGS. 5 and 7, the front-rear frames 31 each include the rear horizontal portion 39a formed substantially horizontally, the inclined portion 39b extending frontward and upward from the front end of the rear horizontal portion 39a, and the front horizontal portion 39c extending horizontally frontward from the front end of the inclined portion 39b. As shown in FIGS. 1 and 3, the front cross member 32 is joined at the left and right ends thereof to the front horizontal portions 39c respectively corresponding to the left and right ends, and, as shown in FIG. 4, the rear end of the front horizontal portion 39c (i.e., the front boundary portion 39f) is disposed to be positioned frontward of the front end 10f of the engine 10 as a vehicle driving apparatus, and the front-rear frame 31 are deformed into a Z shape in vehicle side view in the event of a front-end collision and thereby absorb energy of the front-end collision is absorbed (see FIGS. 11A to 11D).

The above configuration allows the front-rear frame 31 to be deformed into a Z shape in vehicle side view in the event of a front-end collision when the front cross member 32 joined to the left and right front cross members 32 is retracted until it directly or indirectly contacts the engine 10, and thereby large energy absorption can be achieved.

More specifically, for increased energy absorption by the front portion of the vehicle body in the event of a front-end collision, it is considered effective to make the subframe 30 absorb energy of the front-end collision, in addition to the main crash cans 17, the sub crash cans 47, and the front side frames 9.

However, due to the engine 10 being a robust structure that does not crush in the vehicle front-rear direction, simply compressing the subframe 30 axially in the vehicle front-rear direction in the event of a front-end collision would result in only the portion of the subframe 30 frontward of the front end 10f of the engine 10 being axially compressed, from which sufficient energy absorption by the subframe 30 cannot be expected.

In particular, in the present embodiment, the robust stabilizer mounting bracket 50 is fastened and fixed to the inclined portion 39b positioned frontward of the front end 10f of the engine 10 (see FIGS. 4 to 8 and 10), and accordingly, even when the portion of the subframe 30 frontward of the front end 10f of the engine 10 is to be axially compressed in the vehicle front-rear direction, the very axial compression is inhibited. Thus, sufficient energy absorption cannot be expected from axially compressing the subframe 30 in the vehicle front-rear direction in the event of a front-end collision.

In view of this, in the present embodiment, the front horizontal portion 39c disposed offset upward relative to the rear horizontal portion 39a is retracted in the event of a front-end collision until, for example, the front cross member 32 directly or indirectly hits the front side (10f) of the engine 10, whereby the front-rear frame 31 can be deformed into a Z shape in vehicle side view.

In other words, in the event of a front-end collision, effective use is made of the space frontward of the front end 10f of the engine 10 and above the subframe 30 to allow the front-rear frame 31 to be bent in the up-down direction too, which allows to achieve large energy absorption that wouldn't be achieved from simply compressing only the portion of the front-rear frame 31 frontward of the front end of the engine 10 axially in the vehicle front-rear direction.

In one aspect of this disclosure, as shown in FIGS. 4 and 7, the rear end of the inclined portion 39b (the rear boundary portion 39r) is disposed to be positioned frontward of the front end 10f of the engine 10.

This configuration allows the front cross member 32 between the left and right front horizontal portions 39c to be distanced further frontward from the front end 10f of the engine 10, as compared to a configuration in which the rear end of the front horizontal portion 39c (the front boundary portion 39f) is positioned frontward of the front end 10f of the engine 10 but the rear end of the inclined portion 39b (the rear boundary portion 39r) is positioned rearward of the front end 10f of the engine 10.

This allows the front cross member 32, namely the front horizontal portion 39c to be retracted in the space frontward of the front end 10f of the engine 10 in the event of a front-end collision. This allows for easy deformation of the front-rear frame 31 in the event of a front-end collision such that the front horizontal portion 39c is separated above from, and comes closer to, the rear horizontal portion 39a, which consequently facilitates breakage of the front-rear frame 31 into a Z shape in vehicle side view.

In one aspect of this disclosure, as shown in FIGS. 5, 8, and 10, the rear boundary portion 39r positioned at the boundary between the rear horizontal portion 39a and the inclined portion 39b is formed with the rear recess 40r as a recess extending in the vehicle width direction, and, as shown in FIGS. 3, 5, and 9, the front boundary portion 39f positioned at the boundary between the front horizontal portion 39c and the inclined portion 39b is formed with the front recess 40f as a recess extending in the vehicle width direction.

This configuration facilitates breakage of the rear boundary portion 39r and the front boundary portion 39f by the rear boundary portion 39r and the front boundary portion 39f, respectively, in the event of a front-end collision.

In one aspect of this disclosure, as shown in FIGS. 5, 8, and 10, in the rear boundary portion 39r, the rear recess 40r is formed on the upper wall 34a of the front-rear frame 31, and, as shown in FIGS. 5 and 9, in the front boundary portion 39f, the front recess 40f is formed on the lower wall 35a of the front-rear frame 31.

In the above configuration, the front boundary portion 39f is bent such that the lower wall 35a of the front-rear frame 31 is bent inward (see FIGS. 11C and 11D). Thus, forming the front recess 40f on the lower wall 35a can facilitate bending (breakage) of the front boundary portion 39f in the event of the front-end collision.

Meanwhile, the rear boundary portion 39r is bent such that the upper wall 34a of the front-rear frame 31 is bent inward (see the same figures). Thus, forming the rear recess 40r on the upper wall 34a can facilitate bending (breakage) of the rear boundary portion 39r in the event of the front-end collision.

In one aspect of this present disclosure, as shown in FIGS. 4, 5, 7, and 8, the stabilizer 70 disposed frontward of the engine 10 is mounted on the upper wall (34a) of the inclined portion 39b via the stabilizer mounting bracket 50, and, as shown in FIG. 5, the stabilizer mounting bracket 50 has the length corresponding to the total length of the inclined portion 39b in its extending direction (vehicle front-rear direction) (L50>L39b), and, of the front boundary portion 39f and the rear boundary portion 39r, the stabilizer mounting bracket 50 is disposed to only overlap the front boundary portion 39f in the vehicle front-rear direction.

In the above configuration, when the front-rear frame 31 is deformed into a Z shape in vehicle side view in the event of a front-end collision, the upper wall 34a of a portion corresponding to the rear boundary portion 39r of the front-rear frame 31 is compressively deformed (deformed by inward bending) and the upper wall 34a of a portion corresponding to the front boundary portion 39f is extensively deformed (deformed by outward bending) (see FIGS. 11C and D).

Thus, if the stabilizer mounting bracket 50 of the length at least corresponding to the total length of the inclined portion 39b in its extending direction is simply mounted on the upper wall (34a) of the inclined portion 39b, both of the front boundary portion 39f and the rear boundary portion 39r would be covered (overlapped) from above with the disposed stabilizer mounting bracket 50. This would result in the stabilizer mounting bracket 50 inhibiting bending deformation of both of the boundary portions 39f, 39r in the event of a front-end collision, which is unfavorable.

Here, in the event of a front-end collision, the upper wall 34a of a portion corresponding to the rear boundary portion 39r of the front-rear frame 31 is bent and deformed around the rear boundary portion 39r into a V shape in vehicle side view, or in other words, is compressively deformed (see FIGS. 11C and 11D). Thus, particularly if the rear boundary portion 39r is covered from above with the stabilizer mounting bracket 50, there is a fear that the presence of the stabilizer mounting bracket 50 above the upper wall 34a to be bent and deformed into a V shape in the event of a front-end collision may physically inhibit the bending deformation of the rear boundary portion 39r that would otherwise progress more.

In the present embodiment, on the other hand, the stabilizer mounting bracket 50 is disposed offset frontward so as not to cover from above the rear boundary portion 39r of the rear and front boundary portions 39r, 39f (see FIG. 5). This restrains the stabilizer mounting bracket 50 from inhibiting the compressive bending of the upper wall 34a of the front-rear frame 31 in the rear boundary portion 39r.

In one aspect of this disclosure, as shown in FIG. 5, the stabilizer mounting bracket 50 is configured to mount the stabilizer 70 at a position separated above from the upper wall 34a corresponding to the front boundary portion 39f in the front-rear frame 31.

In the above configuration, when the front-rear frame 31 is deformed into a Z shape in vehicle side view in the event of a front-end collision, the upper wall 34a corresponding to the front boundary portion 39f in the front-rear frame 31 is extensively deformed (deformed by outward bending) as described above, and there is a fear that covering the upper wall 34a corresponding to the front boundary portion 39f in the front-rear frame 31 with the rigid stabilizer mounting bracket 50 from above may inhibit such deformation.

More specifically, covering the upper wall 34a of the front boundary portion 39f, which is bent outward during deformation of the front-rear frame 31 into a Z shape in vehicle side view in the event of a front-end collision, with the stabilizer mounting bracket 50 from above is more preferable than covering the upper wall 34a of the rear boundary portion 39r, which is bent inward during the above deformation of the front-rear frame 31, with the stabilizer mounting bracket 50 from above because the former is less likely to inhibit the deformation of the corresponding bent portion. However if, for example, the upper wall 34a of the front boundary portion 39f is covered with the stabilizer mounting bracket 50 such that its bottom side (the bottom side 52ad of the upper wall 52a of the bracket lower member 52 (see FIG. 5)) closely contacts the upper wall 34a of the front boundary portion 39f, the stabilizer mounting bracket 50 acts as an obstacle to breakage deformation of the front boundary portion 39f in the event of a front-end collision and does inhibit that breakage deformation.

Thus, in the present embodiment, the stabilizer mounting bracket 50 (the upper wall 52a of the bracket lower member 52) is disposed at a position separated above from the upper wall 34a of the front-rear frame 31 (see FIG. 5), and this restrains the rigid stabilizer mounting bracket 50 from inhibiting outward bending deformation of the upper wall 34a corresponding to the front boundary portion 39f in the front-rear frame 31.

In one aspect of this present disclosure, as shown in FIGS. 5, 7, and 8, the front-rear frame 31 has an upper and lower divided structure that is composed of the upper member 34 (upper-side member) and the lower member 35 (lower-side member), and these upper member 34 and lower member 35 are joined to form the shape of the front-rear frame 31. The front-rear frame 31 is provided with, at its portion in the vehicle front-rear direction overlapping the stabilizer mounting bracket 50, the unjoined portion 41N where the upper member 34 and the lower member 35 are not joined.

In the above configuration, as shown in FIGS. 4 and 8 to 10, the front-rear frame 31 is provided with the unjoined portion 41N at its portion overlapping the stabilizer mounting bracket 50 in the vehicle front-rear direction, and this restrains the bending deformation of the front boundary portion 39f in the event of a front-end collision from being inhibited by increased rigidity caused by joining the stabilizer 70 to the front-rear frame 31 via the stabilizer mounting bracket 50.

In other words, the above configuration allows to lower the peak load Lp (see FIG. 12) on the vehicle when the front-rear frame 31 starts to be deformed in the event of a front-end collision, which consequently reduces load on an occupant(s) in the event of the front-end collision.

In one aspect of this disclosure, the lower member 35 is formed to have lower strength than that of the upper member 34.

This configuration can facilitate deformation of the front-rear frame 31 into a Z shape in vehicle side view in the event of a front-end collision and lower the peak load Lp on the vehicle when the front-rear frame 31 starts to be deformed in the event of the front-end collision. Hence, load on an occupant(s) in the event of the front-end collision can be reduced.

If, for example, the entire front-rear frame 31 including the upper member 34 is formed to have low strength like the lower member 35, there is a fear that the subframe 30 is unable to sufficiently absorb the energy of a front-end collision as it is crushed all at once immediately after the start of deformation of the front-rear frame 31 in the event of the front-end collision.

On the other hand, as described above, the upper member 34 is formed to have higher strength than that of the lower member 35, and this allows the subframe 30 to be deformed into a Z shape in vehicle side view while keeping a moderate front-end collision load (see time in FIG. 12).

In one aspect of this disclosure, as shown in FIGS. 3 and 9, the front-rear frame 31 is structured such that the rear horizontal portion 39a is positioned on the vehicle-width-direction inner side relative to the front end of the front horizontal portion 39c and the front-rear frame 31 is gradually positioned toward a vehicle-width-direction outer side from the front end of the rear horizontal portion 39a to the front end of the front horizontal portion 39c.

The above configuration restrains the bending deformation of the front-rear frame 31 into a Z shape in vehicle side view from being negatively affected by breakage of the front-rear frame 31 in the vehicle width direction that would otherwise occur in the event of a front-end collision.

More specifically, if the front-rear frame 31 structured to have its rear horizontal portion 39a positioned on the vehicle-width-direction inner side relative to the front end of the front horizontal portion 39c includes, at its portion from the front end of the front horizontal portion 39c to the rear horizontal portion 39a, a bending deformed portion that is deformed by bending sharply in the vehicle width direction, there is a fear that breakage in the vehicle width direction may occur in the event of a front-end collision due to concentration of a front-end collision load on the bending deformed portion or other reasons.

If breakage in the vehicle width direction occurs in the front-rear frame 31 (namely if the front-rear frame 31 experiences transverse breakage) in the event of a front-end collision, there is a fear that such breakage may inhibit the bending deformation of the front-rear frame 31 into a Z shape in vehicle side view and lead to a failure to achieve appropriate energy absorption.

Thus, in the present disclosure, the front-rear frame 31 structured to have its rear horizontal portion 39a positioned on the vehicle-width-direction inner side relative to the front end of the front horizontal portion 39c is structured such that it is gradually positioned toward a vehicle-width-direction outer side from the front end of the rear horizontal portion 39a to the front end of the front horizontal portion 39c. This restrains the bending deformation of the front-rear frame 31 into a Z shape in vehicle side view in the event of a front-end collision.

The present disclosure is not limited to the above embodiment and may be embodied in various forms. For example, as long as the front boundary portion 39f is disposed frontward of the front end 10f of the engine 10 in the vehicle, the front-rear frame of the present disclosure may be configured to have its rear boundary portion 39r disposed rearward of the front end 10f of the engine 10 in the vehicle, besides the configuration in which the rear boundary portion 39r is disposed substantially at the same position as the front end 10f of the engine 10 in the vehicle front-rear direction as the front-rear frame 31 in the above embodiment.

While the vehicle component disposed frontward of the engine 10 and mounted on the upper wall (34a) of the inclined portion 39b via a vehicle component mounting bracket (the stabilizer mounting bracket 50 in the present example) is the stabilizer 70 in the present embodiment, any other vehicle component is applicable.

What is claimed is:

1. A subframe structure for a front suspension, the subframe structure comprising:
   a pair of left and right front-rear frames each mounted with a suspension arm; and
   a transverse member connecting front portions of the front-rear frames, wherein
   the front-rear frames each includes a rear horizontal portion formed substantially horizontally, an inclined portion extending frontward and upward from a front end of the rear horizontal portion, and a front horizontal portion extending horizontally frontward from a front end of the inclined portion, the transverse member is jointed at left and right ends thereof to the front horizontal portions respectively corresponding to the left and right ends, a rear end of the front horizontal portion is disposed frontward of a front end of a vehicle driving apparatus, the front-rear frames are deformed into a Z shape in vehicle side view in an event of a front-end collision and thereby energy of the front-end collision is absorbed, and a rear end of the inclined portion is disposed frontward of the front end of the vehicle driving apparatus.

2. A subframe structure for a front suspension, the subframe structure comprising:

a pair of left and right front-rear frames each mounted with a suspension arm; and a transverse member connecting front portions of the front-rear frames, wherein the front-rear frames each includes a rear horizontal portion formed substantially horizontally, an inclined portion extending frontward and upward from a front end of the rear horizontal portion, and a front horizontal portion extending horizontally frontward from a front end of the inclined portion, the transverse member is jointed at left and right ends thereof to the front horizontal portions respectively corresponding to the left and right ends, a rear end of the front horizontal portion is disposed frontward of a front end of a vehicle driving apparatus, the front-rear frames are deformed into a Z shape in vehicle side view in an event of a front-end collision and thereby energy of the front-end collision is absorbed, wherein a recess extending in a vehicle width direction is formed in at least one of a rear boundary portion that is located at a boundary between the rear horizontal portion and the inclined portion, and a front boundary portion that is located at a boundary between the inclined portion and the front horizontal portion.

3. The subframe structure according to claim 2, wherein the recess is formed in each of the rear boundary portion and the front boundary portion, and the recess is formed on an upper wall of the front-rear frame in the rear boundary portion, and formed on a lower wall of the front-rear frame in the front boundary portion.

4. The subframe structure according to claim 3, wherein a vehicle component disposed frontward of the vehicle driving apparatus is mounted on an upper wall of the inclined portion via a vehicle component mounting bracket, the vehicle component mounting bracket at least has a length corresponding to a total length of the inclined portion in an extending direction of the inclined portion, and of a rear boundary portion that is located at a boundary between the rear horizontal portion and the inclined portion and a front boundary portion that is located at a boundary between the inclined portion and the front horizontal portion, the vehicle component mounting bracket is disposed to only overlap the front boundary portion in a vehicle front-rear direction of the front-rear frame.

5. The subframe structure according to claim 4, wherein the vehicle component mounting bracket is configured to mount the vehicle component at a position separated above from an upper wall corresponding to the front boundary portion in the front-rear frame.

6. The subframe structure according to claim 4, wherein the vehicle component is a stabilizer extending in a vehicle width direction so as to connect the pair of left and right front-rear frames.

7. The subframe structure according to claim 4, wherein the front-rear frame has an upper and lower divided structure composed of an upper-side member and a lower-side member, and the upper-side member and the lower-side member are joined to form a shape of the front-rear frame, and the front-rear frame is provided with an unjoined portion at a portion thereof overlapping the vehicle component mounting bracket in the vehicle front-rear direction, the unjoined portion being a portion where the upper-side member and the lower-side member are not joined.

8. The subframe structure according to claim 7, wherein the lower-side member is formed to have lower strength than strength of the upper-side member.

9. The subframe structure according to claim 1, wherein the front-rear frame is structured such that the rear horizontal portion is positioned on a vehicle-width-direction inner side relative to a front end of the front horizontal portion, and the front-rear frame is gradually positioned toward a vehicle-width-direction outer side from the front end of the rear horizontal portion to the front end of the front horizontal portion.

10. The subframe structure according to claim 1, wherein a recess extending in a vehicle width direction is formed in at least one of a rear boundary portion that is located at a boundary between the rear horizontal portion and the inclined portion, and a front boundary portion that is located at a boundary between the inclined portion and the front horizontal portion.

11. The subframe structure according to claim 7, wherein the front-rear frame is structured such that the rear horizontal portion is positioned on a vehicle-width-direction inner side relative to a front end of the front horizontal portion, and the front-rear frame is gradually positioned toward a vehicle-width-direction outer side from the front end of the rear horizontal portion to the front end of the front horizontal portion.

* * * * *